US012774253B2

(12) United States Patent
Sadamochi

(10) Patent No.: US 12,774,253 B2
(45) Date of Patent: Oct. 27, 2026

(54) METHOD FOR MANUFACTURING PHOSPHOR CERAMIC AND METHOD FOR MANUFACTURING LIGHT-EMITTING DEVICE

(71) Applicant: NICHIA CORPORATION, Anan (JP)

(72) Inventor: Takeshi Sadamochi, Tokushima (JP)

(73) Assignee: NICHIA CORPORATION, Anan (JP)

( * ) Notice: Subject to any disclaimer, the term of this patent is extended or adjusted under 35 U.S.C. 154(b) by 672 days.

(21) Appl. No.: 18/259,270

(22) PCT Filed: Dec. 20, 2021

(86) PCT No.: PCT/JP2021/046929
§ 371 (c)(1),
(2) Date: Jun. 24, 2023

(87) PCT Pub. No.: WO2022/138530
PCT Pub. Date: Jun. 30, 2022

(65) Prior Publication Data
US 2024/0051877 A1 Feb. 15, 2024

(30) Foreign Application Priority Data
Dec. 25, 2020 (JP) ................................ 2020-217164

(51) Int. Cl.
*C04B 35/581* (2006.01)
*C04B 41/45* (2006.01)
(Continued)

(52) U.S. Cl.
CPC ........ *C04B 35/581* (2013.01); *C04B 41/4519* (2013.01); *C04B 41/85* (2013.01);
(Continued)

(58) Field of Classification Search
CPC ........... C09K 11/77346; C04B 35/581; C04B 41/4519; C04B 41/85; C04B 2235/3865;
(Continued)

(56) References Cited

U.S. PATENT DOCUMENTS 5,198,394 A 3/1993 Sugimoto et al.
6,225,249 B1 5/2001 Fujita et al.
(Continued)

FOREIGN PATENT DOCUMENTS

CN 103540316 A 1/2014
CN 106221695 A 12/2016
(Continued)

*Primary Examiner* — C Melissa Koslow
(74) *Attorney, Agent, or Firm* — Hunton Andrews Kurth LLP

(57) ABSTRACT

Provided are a method for manufacturing a phosphor ceramic that emits light when excited by excitation light, and a method for manufacturing a light-emitting device. The method for manufacturing a phosphor ceramic includes preparing a precursor that is either a molded body containing aluminum nitride or a sintered body containing aluminum nitride, and producing an aluminum nitride phosphor ceramic having a content of europium in a range from greater than 0.03 mass % to 1.5 mass % by bringing the precursor into contact with a gas containing europium.

13 Claims, 15 Drawing Sheets

(51) Int. Cl.
*C04B 41/85* (2006.01)
*C09K 11/77* (2006.01)

(52) U.S. Cl.
CPC .............................. *C09K 11/77346* (2021.01); *C04B 2235/3224* (2013.01); *C04B 2235/3865* (2013.01); *C04B 2235/46* (2013.01); *C04B 2235/6022* (2013.01); *C04B 2235/614* (2013.01); *C04B 2235/723* (2013.01); *C04B 2235/9646* (2013.01)

(58) Field of Classification Search
CPC ........ C04B 2235/3224; C04B 2235/46; C04B 2235/6022; C04B 2235/614; C04B 2235/9646; C04B 2235/723
See application file for complete search history.

(56) References Cited

U.S. PATENT DOCUMENTS

| | | | |
|---|---|---|---|
| 6,403,510 | B1 | 6/2002 | Kuibira et al. |
| 7,122,490 | B2 | 10/2006 | Kobayashi et al. |
| 7,431,864 | B2 | 10/2008 | Hirosaki |
| 7,553,787 | B2 | 6/2009 | Yoshikawa et al. |
| 7,763,226 | B2 | 7/2010 | Yoshikawa et al. |
| 7,803,733 | B2 | 9/2010 | Teratani et al. |
| 8,022,001 | B2 | 9/2011 | Teratani et al. |
| 8,436,525 | B2 | 5/2013 | Hirosaki |
| 8,852,453 | B2 | 10/2014 | Hirosaki |
| 9,394,206 | B2 | 7/2016 | Nobori et al. |
| 9,670,405 | B2 | 6/2017 | Hirosaki |
| 2004/0171474 | A1 | 9/2004 | Kobayashi et al. |
| 2007/0142205 | A1 | 6/2007 | Yoshikawa et al. |
| 2007/0194685 | A1 | 8/2007 | Hirosaki |
| 2007/0257231 | A1 | 11/2007 | Hirosaki |
| 2008/0012038 | A1 | 1/2008 | Teratani et al. |
| 2008/0242531 | A1 | 10/2008 | Teratani et al. |
| 2009/0220404 | A1 | 9/2009 | Yoshikawa et al. |
| 2010/0128409 | A1 | 5/2010 | Teratani et al. |
| 2012/0032579 | A1 | 2/2012 | Hirosaki |
| 2012/0248716 | A1 | 10/2012 | Nobori et al. |
| 2014/0332992 | A1 | 11/2014 | Hirosaki |
| 2023/0143058 | A1 | 5/2023 | Sadamochi |

FOREIGN PATENT DOCUMENTS

| | | | | |
|---|---|---|---|---|
| EP | 0548424 | A1 | 6/1993 | |
| JP | S6071575 | A | 4/1985 | |
| JP | S6217074 | A | 1/1987 | |
| JP | S62167260 | A | 7/1987 | |
| JP | H04149070 | A | 5/1992 | |
| JP | 2000086345 | A | 3/2000 | |
| JP | 2001064079 | A | 3/2001 | |
| JP | 2004250318 | A | 9/2004 | |
| JP | 2004262750 | A | 9/2004 | |
| JP | 2007191383 | A | 8/2007 | |
| JP | 2008038143 | A | 2/2008 | |
| JP | 2008239386 | A | 10/2008 | |
| JP | 2010120822 | A | 6/2010 | |
| JP | 2012216816 | A | 11/2012 | |
| JP | 2014175482 | A | 9/2014 | |
| WO | 2006016711 | A1 | 2/2006 | |
| WO | WO-2010065099 | A1 * | 6/2010 | .......... H10P 72/0436 |
| WO | 2021206151 | A1 | 10/2021 | |

* cited by examiner

METHOD FOR MANUFACTURING PHOSPHOR CERAMIC AND METHOD FOR MANUFACTURING LIGHT-EMITTING DEVICE

CROSS-REFERENCE TO RELATED APPLICATION

This application is a national stage entry of International Application No. PCT/JP2021/046929, filed on Dec. 20, 2021, which claims priority to Japanese Patent Application No. 2020-217164, filed on Dec. 25, 2020, the disclosures of which is hereby incorporated by reference in its entirety.

TECHNICAL FIELD

The present invention relates to a method for manufacturing a phosphor ceramic and a method for manufacturing a light-emitting device.

BACKGROUND ART

A light-emitting device that uses, as a light-emitting element, a light-emitting diode (LED) or a laser diode (LD) is utilized as an alternative light source to an incandescent bulb and a fluorescent lamp. For example, a light-emitting device that uses an LED and a wavelength conversion member including an inorganic phosphor in a powder form, and a resin emits mixed light of light emitted from the LED and light emitted from the inorganic phosphor excited by the light emitted from the LED. Such a light-emitting device that uses an LED and an inorganic phosphor is utilized not only in lighting fields such as indoor lighting and in-vehicle lighting, but also in a wide range of fields such as liquid crystal backlight light sources and illumination. Further, a light-emitting device that combines an LD and an inorganic phosphor is used in fields such as projector light sources, for example.

Patent Document 1 discloses a method for manufacturing a sialon phosphor, the method including directly filling a container or the like with powder aggregates of a mixture in which the powder aggregates are made uniform in granularity, the container being filled at a filling ratio at which a bulk density of 40% or less is exhibited without applying a mechanical force to the powder and without molding the powder in advance using a mold or the like, and subsequently sintering the filled container.

Patent Document 2 discloses a method for manufacturing a luminescent sintered body by mixing an aluminum nitride powder, a sintering aid, and a compound containing an element serving as a light emission center, and subsequently firing the resultant mixture.

CITATION LIST

Patent Literature

Patent Document 1: WO 2006/016711
Patent Document 2: JP 62-167260 A

SUMMARY OF INVENTION

Technical Problem

However, with the methods described in Patent Documents 1 and 2, it is difficult to produce a dense sintered body, and thus improvement in thermal conductivity of a sintered body is desired.

Therefore, an object of the present disclosure is to provide a method for manufacturing a phosphor ceramic that has high thermal conductivity and emits light when excited by an excitation light source, and a method for manufacturing a light-emitting device.

Solution to Problem

The present disclosure encompasses the following aspects.

A first aspect of the present disclosure is a method for manufacturing a phosphor ceramic, the method including: preparing a precursor that is either a molded body containing aluminum nitride or sintered body containing aluminum nitride; and producing an aluminum nitride phosphor ceramic having a content of europium in a range from greater than 0.03 mass % to 1.5 mass % by bringing the precursor into contact with a gas containing europium.

A second aspect of the present disclosure is a method for manufacturing a light-emitting device, the method including: preparing a phosphor ceramic manufactured by the manufacturing method described above; preparing an excitation light source; and disposing the phosphor ceramic at a position to be irradiated with light emitted by the excitation light source.

Advantageous Effects of Invention

According to the above-described aspects, a method for manufacturing a phosphor ceramic having high thermal conductivity and emitting light when excited by an excitation light source, and a method for manufacturing a light-emitting device can be provided.

DESCRIPTION OF EMBODIMENTS

Hereinafter, a phosphor ceramic, a method for manufacturing the phosphor ceramic, and a method for manufacturing a light-emitting device according to the present disclosure will be described on the basis of embodiments. However, the embodiments presented below are examples for embodying the technical concept of the present invention, and the present invention is not limited to the following phosphor ceramic, light-emitting device, method for manufacturing the phosphor ceramic, and method for manufacturing the light-emitting device. Note that, in the present specification, green light refers to light having a light emission peak wavelength in a range from 490 nm to 550 nm. Also, in the present specification, ceramic refers to an aggregate of an inorganic non-metallic material in which a plurality of powder particles is bonded by sintering. Therefore, for example, an aluminum nitride powder that maintains the state of the raw material powder is not included in the term ceramic. In the present specification, the ceramic is mainly aluminum nitride, and oxides containing aluminum and another element are also covered by the term ceramic. In the present specification, "mainly aluminum nitride" means that the content of aluminum nitride contained in the ceramic is 90 mass % or more.

Method for Manufacturing Phosphor Ceramic

Figure 1:
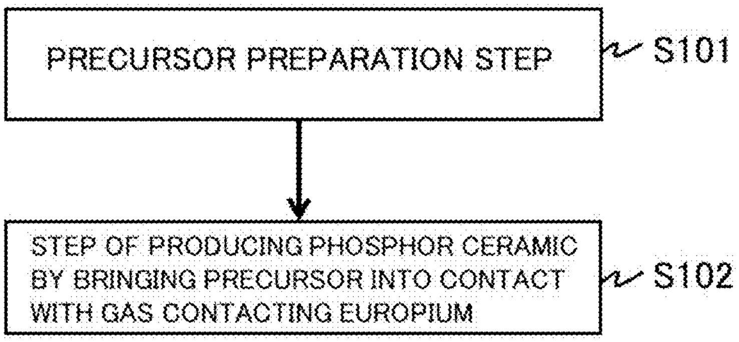
FIG. 1 is a flowchart illustrating an example of a method for manufacturing a phosphor ceramic.

The method for manufacturing a phosphor ceramic includes: preparing a precursor that is either a molded body containing aluminum nitride or a sintered body containing aluminum nitride, and producing an aluminum nitride phosphor ceramic (may be referred to hereinafter as an "AlN phosphor ceramic") having a content of europium in a range from greater than 0.03 mass % to 1.5 mass % by bringing the precursor into contact with a gas containing europium. FIG. 1 is a flowchart illustrating an example of the method for manufacturing a phosphor ceramic. The method for manufacturing the phosphor ceramic includes a step S101 of preparing a precursor and a step S102 of producing a phosphor ceramic by bringing the precursor into contact with a gas containing europium (Eu).

With the method for manufacturing a phosphor ceramic according to the present embodiment, a phosphor ceramic having high thermal conductivity and emitting light when excited by an excitation light source can be produced by bringing the precursor into contact with the gas containing europium.

Step of Preparing Precursor

The precursor is a molded body containing aluminum nitride or a sintered body containing aluminum nitride. The precursor may be prepared by manufacturing the molded body or sintered body through a below described method for manufacturing a precursor, or may be prepared using a commercially available sintered body of aluminum nitride. Aluminum nitride is the main component of the precursor. For example, the content of the aluminum nitride in relation to the entire precursor is preferably 90 mass % or greater.

Figure 2:
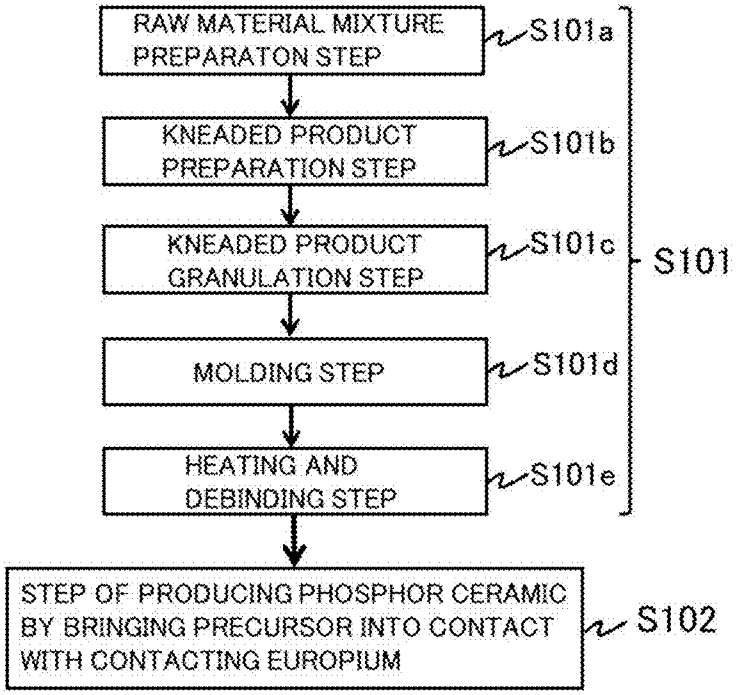
FIG. 2 is a flowchart illustrating a method for manufacturing a phosphor ceramic, the method including an example of a method for manufacturing a precursor.
Figure 3:
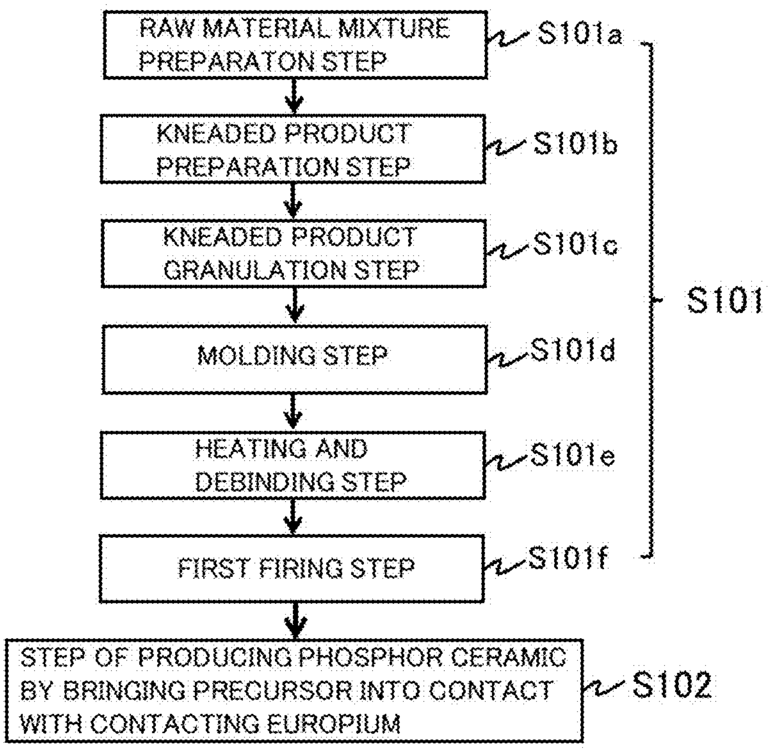
FIG. 3 is a flowchart illustrating a method for manufacturing a phosphor ceramic, the method including an example of a method for manufacturing a precursor.

The method for manufacturing the precursor in order to prepare the precursor will be described. The precursor is either a molded body containing aluminum nitride or a sintered body containing aluminum nitride. FIG. 2 is a flowchart illustrating a method for manufacturing a phosphor, the method including an example of a method for manufacturing the precursor in a case in which the precursor is a molded body containing aluminum nitride. FIG. 3 is a flowchart illustrating a method for manufacturing a phosphor ceramic, the method including an example of a method for manufacturing the precursor in a case in which the precursor is a sintered body containing aluminum nitride.

With reference to FIGS. 2 and 3, an example of a method for manufacturing the precursor in the case in which the precursor is a molded body or in the case in which the precursor is a sintered body will be described. In the case in which the precursor is a molded body, the method for manufacturing the molded body includes a step S101*a* of preparing a raw material mixture and a molding step S101*d*. If necessary, any or all of a step S101*b* of preparing a kneaded product, a step S101*c* of granulating the kneaded product, and a step S101*e* of heating and debinding may be included. When the precursor is a sintered body, the method further includes a first firing step S101*f*.

Raw Material Mixture Preparation Step

The raw material mixture contains aluminum nitride and may contain, as necessary, a sintering aid containing a rare earth element other than europium.

Aluminum Nitride

Aluminum nitride particles can be used as the aluminum nitride. These aluminum nitride particles can be manufactured by a known manufacturing method. For example, the aluminum nitride may be produced by direct nitriding or combustion synthesis in which a metallic aluminum powder is combusted and synthesized in a nitrogen atmosphere, or by reductive nitriding in which aluminum oxide powder is heated and reduced in nitrogen. Further, the aluminum nitride may be produced by a reaction between organic aluminum and ammonia.

In the present specification, a central particle size Da of the aluminum nitride particles is the particle size corresponding to 50% in a volume-based cumulative particle size distribution measured by the Coulter counter method. The Coulter counter method is a method of measuring a particle size without distinguishing primary particles and secondary particles by utilizing electrical resistance when particles dispersed in an electrolyte aqueous solution pass through a fine pore (aperture) on the basis of the Coulter principle. The particle size distribution can be measured using a particle size distribution measuring device (for example, CMS available from Beckman Coulter Inc.).

The central particle size Da of the aluminum nitride particles is preferably in a range from 0.1 μm to 5 μm, more preferably in a range from 0.3 μm to 3 μm, and even more preferably in a range from 0.5 μm to 1.5 μm. Through this, a dense sintered body and a phosphor ceramic having high thermal conductivity can be produced.

In the powder of aluminum nitride particles, a content of oxygen is preferably 2 mass % or less, and more preferably 1.5 mass % or less, relative to the total amount of the powder of aluminum nitride particles. When the content of oxygen in the powder of aluminum nitride particles is 2 mass % or less, point defects of Al in the lattice of the aluminum nitride crystals constituting the base material of the phosphor ceramic can be reduced, the amount of grain boundary phases formed from oxides is reduced, and a phosphor ceramic having high thermal conductivity can be manufactured. The content of the oxygen in the powder of aluminum nitride particles can be measured with an oxygen/nitrogen analyzer (for example, model number EMGA-820 available from Horiba, Ltd.).

Preferably, the raw material powder of aluminum nitride particles does not contain any metal element except for aluminum. In particular, when iron is contained in the powder of aluminum nitride particles, the produced phosphor ceramic may be colored black, and thus the powder of aluminum nitride particles preferably does not contain iron. In relation to the total amount of the powder of aluminum nitride particles, a content of metal elements excluding aluminum in the powder of aluminum nitride particles is preferably 1 mass % or less, more preferably 0.5 mass % or less, even more preferably 0.1 mass % or less, and particularly preferably 0.01 mass % or less. Through this, coloration of the produced phosphor ceramic can be reduced. In addition, a decrease in thermal conductivity can also be reduced. The content of metal elements excluding aluminum in the powder of aluminum nitride particles can be measured using an inductively coupled high-frequency plasma atomic emission spectrometry (ICP-AES) device.

The reflectivity of the aluminum nitride particles in a wavelength range from 400 nm to 700 nm is preferably 50% or greater, and more preferably 70% or greater. When the reflectivity of the aluminum nitride particles in a wavelength range from 400 nm to 700 nm is 50% or greater, the reflectivity of the produced phosphor ceramic is also increased, and thereby the luminous intensity of green light when excited by the excitation light source can be increased.

The content of the aluminum nitride particles in the raw material mixture is preferably in a range from 90 mass % to 99.8 mass % relative to 100 mass % of the raw material mixture. By setting the content of aluminum nitride particles to within this range and bringing the precursor containing aluminum nitride as a base material into contact with a gas containing europium, a phosphor ceramic that contains europium in a range from greater than 0.03 mass % to 1.5 mass %, exhibits high thermal conductivity, and emits light when excited by excitation light can be produced. Further, the content of aluminum nitride in the raw material mixture is more preferably in a range from 93 mass % to 99.7 mass %, even more preferably in a range from 95 mass % to 99.6 mass %, and yet even more preferably in a range from 95 mass % to 99.5 mass %.

Sintering Aid Containing Rare Earth Metal Other than Europium

The raw material mixture may contain a sintering aid. When a sintering aid is contained in the raw material mixture, aluminum nitride crystals are densely bonded to each other, and a phosphor ceramic having high thermal conductivity can be produced. Examples of the sintering aid include compounds containing an alkaline earth metal element and compounds containing a rare earth element other than europium. The sintering aid is preferably a sintering aid containing a rare earth element other than europium. Examples of the sintering aid containing a rare earth element other than europium include oxides containing a rare earth element other than europium and fluorides containing a rare earth element other than europium. Specific examples of the sintering aid containing a rare earth element other than europium include yttrium oxide ($Y_2O_3$), lanthanum oxide ($La_2O_3$), cerium oxide ($CeO_2$), ytterbium oxide ($Yb_2O_3$), praseodymium oxide ($PrO_2$), neodymium oxide ($Nd_2O_3$), samarium oxide ($Sm_2O_3$), gadolinium oxide ($Gd_2O_3$), dysprosium oxide ($Dy_2O_3$), and erbium oxide ($Er_2O_3$). The sintering aid containing a rare earth element other than europium is preferably yttrium oxide. Through this, a liquid phase is easily formed with impurity oxygen contained in the aluminum nitride particles, and densification of the sintered body is easily promoted.

A content of the sintering aid in the raw material mixture is, in relation to 100 mass % of the raw material mixture, preferably 10 mass % or less, and may be 7 mass % or less or 5 mass % or less, and may also be 0.05 mass % or more or 0.1 mass % or more. In addition, the raw material mixture may not contain the sintering aid, and the amount of the sintering aid in the raw material mixture may be 0 mass % in relation to 100 mass % of the raw material mixture.

The sintering aid is preferably a powder. A central particle size De of the sintering aid containing a rare earth element other than europium is preferably in a range from 0.1 μm to 5 μm, more preferably in a range from 0.2 μm to 4 μm, and even more preferably in a range from 0.3 μm to 3 μm. A particle size ratio De/Da of the central particle size De of the sintering aid to the central particle size Da of the aluminum nitride particles is preferably in a range from 0.1 to 20. The central particle size De of the sintering aid refers to a particle size corresponding to 50% in a volume-based cumulative particle size distribution measured by the Coulter counter method. When the particle size ratio De/Da of the central particle size De of the sintering aid to the central particle size Da of the aluminum nitride particles is in the range from 0.1 to 20, the particles constituting the raw material mixture are less likely to aggregate and are readily dispersed among the particles, making it easy to produce a sintered body having high density. The particle size ratio De/Da of the central particle size De of the sintering aid to the central particle size Da of the aluminum nitride particles is more preferably in a range from 0.2 to 18, even more preferably in a range from 0.3 to 15, and particularly preferably in a range from 0.5 to 10. When the particle size ratio De/Da is within these ranges, bias is unlikely to occur in the state after mixture with the aluminum nitride particles.

The raw material mixture containing aluminum nitride and, as necessary, a sintering aid containing a rare earth metal other than europium can be produced by dry mixing or wet mixing. Dry mixing refers to mixing the aluminum nitride and each compound in the absence of liquid. Wet mixing refers to mixing the raw materials in a state of containing an organic solvent or water. The preferred mixing method is dry mixing. In the case of dry mixing, the mixed powder may include large and small particles as sintering aids. Relatively large sintering aid particles are considered likely to produce a localized liquid phase. A localized liquid phase is thought to facilitate rearrangement of the aluminum nitride particles and thereby facilitate the formation of a dense sintered body. Further, aluminum nitride is sensitive to moisture, and thus dry mixing without the use of moisture is preferred. Further, dry mixing can simplify the manufacturing process compared to wet mixing. For dry mixing, a known device such as a super mixer, an axial mixer, a henschel mixer, a ribbon mixer, or a locking mixer can be used. For wet mixing, a known device such as a ball mill or media agitation mill can be used.

Kneaded Product Preparation Step

The precursor preparation step may include a step of preparing a kneaded product by kneading the raw material mixture and an organic substance. Examples of the organic substance include those used as binders, lubricants, and plasticizers. The organic substance included in the kneaded product may be in an amount that can sufficiently mix the raw material mixture and the organic substance without affecting the properties of the resultant sintered body. An amount of organic substance included in the kneaded product is preferably in a range from 10 parts by mass to 25 parts by mass relative to 100 parts by mass of the raw material mixture.

Examples of the organic substance as a binder include at least one thermoplastic resin selected from the group consisting of low-density polyethylene, medium-density polyethylene, high-density polyethylene, low molecular weight polyethylene, ethylene-vinyl acetate copolymer, ethylene acrylate copolymer, polypropylene, atactic polypropylene, polystyrene, polyacetal, polyamide, and methacrylic resin. In addition to these thermoplastic resins, examples of binders include waxes such as paraffin wax and microcrystalline wax. These binders may be used alone or in combination of two or more.

Examples of the organic substance as a lubricant include hydrocarbon-based lubricants such as liquid paraffin and paraffin wax, and fatty acid-based lubricants such as stearic acid and lauryl acid. These lubricants may be used alone or in combination of two or more.

Examples of the organic substance as a plasticizer include phthalates, adipates, and trimellitates. These plasticizers may be used alone or in combination of two or more.

The kneaded product may include an auxiliary agent such as a coupling agent to improve the dispersibility of inorganic powders such as the aluminum nitride and the sintering aid, and the at least one organic substance selected from the group consisting of binders, lubricants, and plasticizers. The auxiliary agent such as the coupling agent may be added to the kneaded product in a range that does not affect the properties of the produced sintered body.

The kneaded product can be produced by using a known device.

Kneaded Product Granulation Step

The precursor preparation step may include a granulation step of granulating the kneaded mixture. The kneaded product may be granulated into a granular form or a pellet form prior to molding the molded body. The kneaded product having a granular form or a pellet form can be produced by using a known device such as a pulverizer, an extruder, or a pelletizer.

Molding Step

The precursor preparation step includes a step of producing a molded body by molding the raw material mixture, a kneaded product formed of the raw material mixture, or a granulated product produced by granulating the kneaded product. The molded body can be produced by molding the raw material mixture or the kneaded product by a known method. Examples of the known molding method include an injection molding method, a press molding method that uses a mold, a cold isostatic pressing (CIP) method, an extrusion method, a doctor blade method, and a casting method. For example, a molded body having a desired shape can be formed through the injection molding method. When the molded body is formed by the injection molding method, cutting or otherwise shaping the phosphor ceramic into the desired shape is not necessarily required after firing the molded body to produce the phosphor ceramic. The aluminum nitride is contained as the base material, and the high density phosphor ceramic is extremely hard and brittle, making machining such as cutting difficult. Further, subjecting the phosphor ceramic to machining such as cutting may cause a defect such as chipping. Therefore, as the method of molding to produce the molded body, the injection molding method by which a molded body having a desired shape is readily produced is preferred.

Heating and Debinding Step

In a case in which the kneaded product is molded to produce a molded body, the precursor preparation step may include heating and debinding the kneaded product that has been molded. When heating and debinding are to be implemented, the method preferably includes heating in a range from 400° C. to 700° C. in an atmosphere including nitrogen. Heating in an atmosphere including nitrogen in the range from 400° C. to 700° C. reduces the amount of carbon contained in the molded body and facilitates debinding. This makes it possible to suppress a decrease in yield caused by the cracking of the sintered body due to the carbon remaining in the kneaded product. Further, oxidation of the sintered body can be suppressed. Further, depending on the type of organic substance, heat may be rapidly generated in the temperature range described above, but this type of rapid increase in temperature can be suppressed by heating in an atmosphere including nitrogen. As a result, deterioration of the furnace can be suppressed. In this specification, an atmosphere including nitrogen refers to a case in which the amount of nitrogen is at least a vol % of the nitrogen included in the air. The nitrogen in the atmosphere including nitrogen need only be 80 vol % or greater, preferably 90 vol % or greater, more preferably 99 vol % or greater, and even more preferably 99.9 vol % or greater. The content of oxygen in the atmosphere including nitrogen may be in a range from 0.01 vol % to 20 vol %, and may be in a range from 0.1 vol % to 10 vol %. The atmospheric pressure at which the heating is performed is, for example, ambient pressure. Furthermore, the heating may be performed under a pressurized environment or a depressurized environment. Further, debinding can be performed by using a known method. The carbon amount in terms of mass in the molded body produced by debinding the molded kneaded product is, for example, preferably 1000 ppm or less, and more preferably 500 ppm or less. The carbon amount of the molded body after debinding can be measured, for example, by a non-dispersive infrared absorption method (NNIR). The debinding time during which heating is performed need only be a time that allows the organic substance in the kneaded product to be debinded, bringing the carbon amount in the molded kneaded product to 1000 ppm or less. Specifically, the time during which heating is performed for debinding (holding time of maximum temperature) is preferably in a range from 0.1 hours to 50 hours, and is changed as appropriate depending on the shape of the molded body to be debinded.

First Firing Step

The precursor may be a sintered body containing aluminum nitride. When the precursor is a sintered body containing aluminum nitride, a step of firing the molded body containing aluminum nitride to thereby produce a sintered body containing aluminum nitride may be included. In the present specification, the step of firing the molded body containing aluminum nitride to produce, as a precursor, a sintered body containing aluminum nitride is also referred to as a first firing step. Firing of the molded body is also referred to as a first firing. In addition, the temperature in the first firing step is referred to as a first firing temperature. The atmosphere in the first firing step is also referred to as a first firing atmosphere.

The first firing temperature is preferably in a range from 1700° C. to 2050° C. Through this, the aluminum nitride particles can be densely bonded to each other by the liquid phase formed between the aluminum nitride particles, and a sintered body containing aluminum nitride with high thermal conductivity can be produced. The first firing temperature is preferably in a range from 1750° C. to 2050° C., is more preferably in a range from 1800° C. to 2050° C., and is even more preferably in a range from 1850° C. to 2050° C. Through this, the thermal conductivity of the precursor can be improved.

The first firing atmosphere is preferably an atmosphere including nitrogen. By implementing the first firing in an atmosphere including nitrogen, the aluminum nitride is less likely to decompose, and a sintered body having high thermal conductivity can be produced. Further, a gas containing nitrogen can be continuously or intermittently supplied to stably maintain an atmosphere including nitrogen as the first firing atmosphere.

The pressure in the first firing atmosphere is, for example, around barometric pressure (101.32 kPa), and is preferably 50 kPa or less as a gauge pressure. An environment with a gauge pressure in a range from 0 kPa to 50 kPa can be relatively easily reached, and thus productivity is improved.

The first firing time need only be a time for producing a dense sintered body. Specifically, the first firing time is preferably within a range from 0.5 hours to 100 hours. In addition, the first firing time is more preferably in a range from 10 hours to 70 hours, and even more preferably in a range from 20 hours to 45 hours. Through such a first firing time, unnecessary oxygen in the molded body is discharged and a denser sintered body can be produced.

In order to reduce the amount of oxygen in the sintered body, the first firing of firing the molded body preferably uses a carbon furnace in which carbon is used as an internal furnace material, such as for a heating element or a heat insulating material. A furnace other than a carbon furnace may also be used as long as the first firing temperature can be maintained.

A setter and crucible on which the molded body is placed are preferably ones that are not deformed or degraded by the first firing temperature. The material of the setter or the crucible is preferably a nitride such as boron nitride or aluminum nitride. Preferably a setter or a crucible made of a material including at least 95 mass % of high-purity nitride is used.

A step of dividing the sintered body into individual pieces may by further included. The shape in a plan view of the sintered body after being divided into individual pieces may be, for example, a substantially circular shape, a substantially rectangular shape, a substantially square shape, a substantially triangular shape, or another polygonal shape.

The precursor is preferably a sintered body containing aluminum nitride. In a case in which the precursor is a sintered body containing aluminum nitride, a phosphor ceramic that emits light when excited by excitation light and has high thermal conductivity can be produced in the step of producing a phosphor ceramic described below by containing europium in the aluminum nitride sintered body.

Preferably, the sintered body containing aluminum nitride contains oxygen, and the oxygen content is 0.3 mass % or less. The thermal conductivity can be further improved by setting the content of oxygen contained in the sintered body containing aluminum nitride to 0.3 mass % or less. This is because the grain boundary phases generated between aluminum nitride particles in the sintered body can be reduced. Since the grain boundary phase exhibits lower thermal conductivity than that of the aluminum nitride, the thermal conductivity of the sintered body containing aluminum nitride can be improved by reducing the number of these grain boundary phases. In addition, by improving the thermal conductivity by setting the oxygen content in the precursor to 0.3 mass % or less in advance, the thermal conductivity can be maintained at a relatively high level in the step of forming the phosphor ceramic described below, even when the precursor is doped with an element serving as a light emission center. In addition, the oxygen content of the sintered body containing aluminum nitride is more preferably in a range from greater than 0 mass % to 0.001 mass %. Through this, the thermal conductivity of the produced sintered body is further improved, and the sintered body can exhibit translucency. For example, when one surface of a 2 mm thick sintered body is irradiated with light having a peak wavelength of 380 nm, light having a peak wavelength of 380 nm can be extracted from a surface of a side opposite the surface irradiated with light. This is because the grain boundary phases are reduced, and absorption of light by the grain boundary phases is suppressed. The energy gap of aluminum nitride is approximately 6.2 eV, and therefore a sintered body containing aluminum nitride exhibits translucency to light having a peak wavelength of approximately 200 nm or greater.

The thermal conductivity of the sintered body containing aluminum nitride can be, for example, in a range from 150 W/m·K to 270 W/m·K. The thermal conductivity is preferably in a range from 200 W/m·K to 270 W/m·K, and is more preferably in a range from 220 W/m·K to 270 W/m·K.

The content of oxygen in the molded body or sintered body serving as the precursor can be measured with an oxygen/nitrogen analyzer (for example, EMGA-820, available from Horiba, Ltd.) after acidolysis of the sintered body. The oxygen content of the sintered body may be equal to or less than the detection limit of the oxygen/nitrogen analyzer.

Step of Producing Phosphor Ceramic

The precursor, which is a molded body containing aluminum nitride or a sintered body containing aluminum nitride, is brought into contact with a gas containing europium, and thereby an aluminum nitride phosphor ceramic in which the content of europium is in a range from greater than 0.03 mass % to 1.5 mass % can be produced.

Firing (Second Firing) Step

The step of producing the phosphor ceramic preferably includes firing the precursor in an atmosphere containing europium at a temperature in a range from a boiling point of metallic europium to less than 2000° C. By firing the precursor in an atmosphere containing europium at a temperature in the range from the boiling point of metallic europium to less than 2000° C., aluminum nitride crystals in the sintered body containing aluminum nitride are easily doped with europium, and an aluminum nitride phosphor ceramic that emits light upon excitation with excitation light can be produced. In the present specification, firing in the step of producing the phosphor ceramic is also referred to as a second firing. The firing temperature in the step of producing the phosphor ceramic is also referred to as a second firing temperature. The firing atmosphere in the step of producing the phosphor ceramic is also referred to as a second firing atmosphere.

The step of producing the aluminum nitride phosphor ceramic preferably includes firing, at a temperature in a range from the boiling point of metallic europium to less than 2000° C., the precursor and a compound that contains europium, and the compound that contains europium is disposed so as not to be in direct contact with the precursor. The precursor that is a molded body containing aluminum nitride or a sintered body containing aluminum nitride is disposed in a furnace, a compound containing europium is disposed in the same furnace so as not to come into contact with the precursor, and the precursor and the compound containing europium are fired at a temperature in a range from the boiling point of metallic europium to less than 2000° C., and thereby the precursor is doped with a vapor containing europium, and an aluminum nitride phosphor ceramic that emits light in response to excitation by excitation light is produced.

The step of producing the aluminum nitride phosphor ceramic can include bringing the compound containing europium into contact with the surface of the precursor and firing at a temperature in a range from the boiling point of metallic europium to less than 2000° C. Through this, an aluminum nitride phosphor ceramic having a content of europium in a range from greater than 0.03 mass % to 1.5 mass % can be produced.

In the step of producing the aluminum nitride phosphor ceramic, in addition to disposing, in the same atmosphere as that of the precursor, a europium source such as a compound containing europium, for example, a gas containing europium can be introduced into the atmosphere for firing. Europium need only be contained in the atmosphere in which the precursor is subjected to the second firing.

The second firing temperature is in a range from the boiling point of metallic europium to less than 2000° C. Specifically, the second firing temperature is preferably in a range from 1530° C. to less than 2000° C. Through this, when the precursor is brought into contact with the gas containing europium, the molded body containing aluminum nitride and the aluminum nitride sintered body are easily doped with europium, and an aluminum nitride phosphor ceramic that absorbs light emitted from an excitation light source and emits light can be produced. The second firing temperature is preferably in a range from 1550° C. to 1950° C., is even more preferably in a range from 1700° C. to 1950° C., and is particularly preferably in a range from 1800° C. to 1950° C. Thereby, the produced aluminum nitride phosphor ceramic can increase luminous intensity while maintaining high thermal conductivity.

The second firing atmosphere is preferably an atmosphere including nitrogen. In this specification, an atmosphere including nitrogen refers to a case in which the amount of nitrogen is at least a vol % of the nitrogen included in the air. The nitrogen in the atmosphere including nitrogen need only be 80 vol % or greater, preferably 90 vol % or greater, more preferably 99 vol % or greater, and even more preferably 99.9 vol % or greater. The content of oxygen in the atmosphere including nitrogen may be in a range from 0.01 vol % to 20 vol %, and may be in a range from 0.1 vol % to 10 vol %. In addition, the atmosphere during the second firing may be an argon (Ar) atmosphere.

The second firing may be implemented, for example, at normal pressure or in a pressurized environment. When the second firing is to be carried out in a pressurized environment, the atmospheric pressure under which the second firing is implemented is, in terms of the gauge pressure, preferably in a range from 0.01 MPa to 0.1 MPa, may be in a range from 0.01 MPa to 0.09 MPa, or may be in a range from 0.01 MPa to 0.08 MPa.

The time for carrying out the second firing may be any time as long as the aluminum nitride phosphor ceramic is doped with europium at an amount in a range from greater than 0.03 mass % to 1.5 mass %, and is set, as appropriate. For example, the second firing may be carried out for a time in a range from 0.1 hours to 20 hours, or in a range from 0.5 hours to 10 hours.

As the compound containing europium, for example, an oxide, a nitride, a hydroxide, or a halide may be used. Examples of the compound containing europium include europium oxide ($Eu_2O_3$), europium nitride (EuN), and europium fluoride ($EuF_3$). As the compound containing europium, europium oxide is stable at room temperature or in the atmosphere and thus is preferably used.

In the step of producing the aluminum nitride phosphor ceramic, the gas containing europium is preferably a gas containing europium produced by reducing europium oxide. An example of the method for reducing europium oxide is a method in which a precursor and europium oxide are placed in a carbon furnace and fired at a temperature in a range from the boiling point of metallic europium to less than 2000° C. to thereby reduce europium oxide and produce a gas containing europium. Another example is a method in which a reducing agent such as carbon is placed in a furnace in which the precursor and europium oxide are disposed, and firing is carried out at a temperature in a range from the boiling point of metallic europium to less than 2000° C. to thereby reduce europium oxide and produce a gas containing europium.

A charging amount of europium in relation to 1 g of aluminum nitride of the precursor can be in a range from 1.4 $mg/cm^3$ to 14 $mg/cm^3$ in terms of the compound containing europium. The charging amount of europium in relation to 1 g of the aluminum nitride of the precursor is preferably in a range from 1.7 $mg/cm^3$ to 11 $mg/cm^3$, and more preferably in a range from 2.0 $mg/cm^3$ to 10 $mg/cm^3$ in terms of the compound containing europium.

Regarding the charging amount of europium in relation to 1 g of the aluminum nitride of the precursor, a compound containing europium in such an amount that the content of europium per unit volume is, for example, in a range from 1.2 $mg/cm^3$ to 12 $mg/cm^3$ can be arranged inside the furnace. The charging amount of the compound containing europium in relation to 1 g of aluminum nitride is preferably an amount such that the content of europium per unit volume is in a range from 1.5 $mg/cm^3$ to 10 $mg/cm^3$, and is more preferably an amount such that the content of europium per unit volume is in a range from 1.7 $mg/cm^3$ to 9.0 $mg/cm^3$. Through such charging amount, an aluminum nitride phosphor ceramic can be produced.

The content of europium in the produced aluminum nitride phosphor ceramic is in a range from greater than 0.03 mass % to 1.5 mass %. As a result, an aluminum nitride phosphor ceramic that emits light by excitation with excitation light can be produced. The content of the europium in the aluminum nitride phosphor ceramic is preferably in a range from 0.05 mass % to 1.1 mass %, more preferably in a range from 0.05 mass % to 0.8 mass %, and even more preferably in a range from 0.1 mass % to 0.7 mass %. When the content thereof is set to such a range, high thermal conductivity is maintained while improving the luminous intensity of the aluminum nitride fluorescent sintered body, and both can be achieved.

The aluminum nitride phosphor ceramic preferably emits green light. Specifically, green light is preferably emitted through excitation light having a light emission peak wavelength in a range from 200 nm to 480 nm, and preferably from 280 nm to 480 nm. Preferably, the aluminum nitride phosphor ceramic emits green light from the same surface as the incident surface on which the excitation light is incident, the incident light is transmitted through the aluminum nitride phosphor ceramic, and the light emitted from the surface opposite the incident surface is also emitted as green light. When the excitation light is transmitted through the aluminum nitride phosphor ceramic and emitted, the emitted light may be, rather than green light, light having a light emission peak wavelength in a wavelength range other than that of green light.

Preferably, in addition to the produced aluminum nitride phosphor ceramic emitting light from the incident surface on which the excitation light is incident, the incident light is transmitted through the aluminum nitride phosphor ceramic and emitted from also the surface of the side opposite the surface on which the excitation light is incident. The aluminum nitride phosphor ceramic preferably emits green light from the incident surface of the excitation light, and preferably, the incident light is transmitted through the aluminum nitride phosphor ceramic, and the light emitted from the surface opposite the incident surface is also emitted as green light. When the excitation light is transmitted through the aluminum nitride phosphor ceramic and emitted, the emitted light may be, rather than green light, light having a light emission peak wavelength in a wavelength range other than that of green light.

Aluminum Nitride Phosphor Ceramic

The aluminum nitride phosphor ceramic contains aluminum nitride, europium, and oxygen, a content of oxygen is 2.5 mass % or less, and a content of europium is in a range from greater than 0.03 mass % to 1.5 mass %. The aluminum nitride phosphor ceramic is preferably produced by the above-described manufacturing method. An amount of europium (Eu) and an amount of yttrium (Y) in the aluminum nitride phosphor ceramic can be measured by an inductively coupled high-frequency plasma atomic emission spectrometry (ICP-AES) device. An amount of oxygen (O) can be measured by an oxygen/nitrogen analyzer.

The content of europium in the aluminum nitride phosphor ceramic is in a range from greater than 0.03 mass % to 1.5 mass %. By adopting such a content of europium, the aluminum nitride crystal phase is doped with europium, and the europium doped in the aluminum nitride crystal phase serves as a light emission center and can absorb light emitted from the excitation light source and emit light. The content of the europium in the aluminum nitride phosphor ceramic is preferably in a range from 0.05 mass % to 1.1 mass %, more preferably in a range from 0.08 mass % to 0.9 mass %, and yet even more preferably in a range from 0.1 mass % to 0.7 mass %. When the content thereof is set to such a range, the aluminum nitride fluorescent sintered body maintains high thermal conductivity while improving the luminous intensity, and both can be achieved.

Also, the aluminum nitride phosphor ceramic contains aluminum nitride, europium, and oxygen, and the content of oxygen is 0.7 mass % or less, and the content of europium is in a range from greater than 0.08 mass % to 0.9 mass %. As a result, the europium becomes the light emission center, and the aluminum nitride phosphor ceramic can receive light emitted from the excitation light source and emit light. The aluminum nitride phosphor ceramic can also emit light from the side opposite the side at which light is received from the excitation light source. Furthermore, since aluminum nitride is the base material, the thermal conductivity can be increased.

The aluminum nitride phosphor ceramic preferably emits light having a light emission peak wavelength in a range from 500 nm to 550 nm in response to light emitted from the excitation light source. The aluminum nitride phosphor ceramic preferably emits green light in response to light from the excitation light source. The aluminum nitride phosphor ceramic preferably emits green light in response to excitation light having a light emission peak wavelength in a range from 200 nm to 480 nm. When the content of europium in the aluminum nitride phosphor ceramic is 0.03 mass % or less, a light-emitting ceramic cannot be produced. When the content of europium in the aluminum nitride phosphor ceramic is greater than 1.5 mass %, the amount of europium is excessive, light in the green wavelength range is absorbed, and the light emission efficiency may decrease.

The aluminum nitride phosphor ceramic contains oxygen in the aluminum nitride phosphor ceramic, and the content of oxygen is 2.5 mass % or less. Through this, an aluminum nitride phosphor ceramic having high thermal conductivity can be produced. The oxygen content of the aluminum nitride phosphor ceramic is preferably 1.0 mass % or less, more preferably 0.7 mass % or less, particularly preferably 0.5 mass % or less. With such an oxygen content, the grain boundary phases composed of an oxide containing nitrogen and aluminum can be reduced in comparison to a case in which the oxygen content is outside of the range described above. A reduced number of grain boundary phases is preferable in terms of light emission characteristics and heat dissipation. From the viewpoint of light emission characteristics, light emitted from an excitation light source and/or fluorescent light having europium as a light emission center is easily extracted to the outside of the aluminum nitride phosphor ceramic. In addition, when the grain boundary phases are reduced, the light transmittance of the aluminum nitride phosphor ceramic is improved, and light can be transmitted through the aluminum nitride phosphor ceramic and emitted from the surface of the side opposite the light incident surface. From the viewpoint of heat dissipation, in the aluminum nitride phosphor ceramic, a configuration can be achieved in which the proportion of aluminum nitride crystal phases having high thermal diffusivity is relatively higher than the proportion of the grain boundary phases that contain nitrogen, aluminum, and oxygen and have low thermal diffusivity. As a result, the thermal diffusivity of the aluminum nitride phosphor ceramic is improved, and the thermal conductivity is increased. In terms of volume, the proportion of the crystal phases relative to the entire aluminum nitride phosphor ceramic may be, for example, in a range from 95% to 99.9%, or in a range from 97% to 99.9%.

The size of the aluminum nitride crystal phase contained in the aluminum nitride phosphor ceramic may be, for example, in a range from 8 μm to 30 μm. The aluminum nitride phosphor ceramic can also include one in which the size of the aluminum nitride crystal phase is in a range from 10 μm to 20 μm. In a case in which, for example, the oxygen contained in the aluminum nitride phosphor ceramic is sufficiently discharged, a crystal phase having such a size can be contained in the aluminum nitride phosphor ceramic as a crystal phase having high purity. As a result, the thermal conductivity of the aluminum nitride phosphor ceramic can be improved. The average value of the size of the aluminum nitride crystal phase is, for example, in a range from 6 μm to 20 μm. The size of the aluminum nitride crystal phase can be determined, for example, by examining the size of the aluminum nitride crystal phase in an area of a cross-sectional SEM image observed at a magnification of 1000 times. The area is, for example, an area of 127 μm×88 μm. A straight line is drawn on the resultant image, and a length from one grain boundary to another grain boundary of the aluminum nitride crystal phase overlapping the straight line is measured.

The aluminum nitride phosphor ceramic may contain at least one rare earth element other than europium, and a content of the rare earth element other than europium may be 0.5 mass % or less. When a sintering aid containing a rare earth element other than europium is contained in a molded body containing aluminum nitride, the aluminum nitride phosphor ceramic may contain the rare earth element contained in the sintering aid. When the content of the rare earth element other than europium in the aluminum nitride phosphor ceramic is 0.5 mass % or less, the grain boundary phases are reduced, and the light transmittance of the aluminum nitride phosphor ceramic is improved.

The rare earth element other than europium and contained in the aluminum nitride phosphor ceramic forms an oxide. This oxide may contain nitrogen and aluminum. The oxide containing the rare earth element other than europium forms a grain boundary phase between aluminum nitride crystal phases. When the sintering aid is yttrium oxide, an oxide containing yttrium can be formed in the grain boundary phase.

Europium doped in the sintered body containing aluminum nitride forms an oxide. This oxide may contain nitrogen and aluminum. The oxide containing europium may form a grain boundary phase between aluminum nitride crystal phases. In the aluminum nitride phosphor ceramic, a grain boundary phase is formed between aluminum nitride crystal phases, and the grain boundary phase can include an oxide phase containing yttrium and an oxide phase containing europium. The yttrium-containing oxide phase and the europium-containing oxide phase may form grain boundary phases separately from each other, or the yttrium-containing oxide phase and the europium-containing oxide phase may become integrated and form one grain boundary phase.

In the aluminum nitride phosphor ceramic, europium is present in the aluminum nitride crystal phase and in the grain boundary phase.

The amount of europium and the amount of yttrium present in the aluminum nitride crystal phase or the grain boundary phase in the aluminum nitride phosphor ceramic can be determined by cutting the aluminum nitride phosphor ceramic so as to expose a cross section thereof, and analyzing a specific location of the cross section using, for example, an electron probe microanalyzer (EPMA) or a scanning electron microscope (SEM) and energy dispersive spectroscopy (EDX). The EPMA can implement measurements using a field emission electronic probe microanalyzer (for example, model number JXA-8500F, available from JEOL Ltd.). SEM and EDX measurements can be implemented using an SEM-EDX apparatus (for example, model number SU8230, available from Shimadzu Corporation, and a silicon drift detector (SDD apparatus), available from Horiba, Ltd.). The amount of europium contained in the grain boundary phase is larger than the amount of europium contained in the aluminum nitride crystal phase. For example, any three to five locations of grain boundary phases can be selected in any cross section of the aluminum nitride phosphor ceramic, the amount of europium in the grain boundary phases of the selected locations can be detected, and the arithmetic mean thereof can be measured as the amount of europium present in the grain boundary phases. On the other hand, it is presumed that europium in the aluminum nitride crystal phase is doped as an activating element. Therefore, since the amount of europium in the aluminum nitride crystal phase is very small, the europium amount thereof may be less than the detection sensitivity of EDX and EPMA, and measurements may not be possible.

The thermal diffusivity of the aluminum nitride phosphor ceramic measured by a laser flash method at 25° C. is 80 $mm^2/s$ or greater. The thermal diffusivity of the aluminum nitride phosphor ceramic measured by the laser flash method may be 65 $mm^2/s$ or greater, is preferably 80 $mm^2/s$ or greater, is more preferably 85 $m^2/s$ or greater, and is even more preferably 90 $mm^2/s$ or greater. The thermal diffusivity is more preferably 95 $mm^2/s$ or greater. The thermal conductivity is determined by the product of the thermal diffusivity, the specific heat capacity, and the density. Therefore, an aluminum nitride phosphor ceramic having a high thermal diffusivity also has high thermal conductivity and excellent heat dissipation properties. The thermal diffusivity of the aluminum nitride phosphor ceramic is equal to or less than the thermal diffusivity of single crystal aluminum nitride, and may be 136.3 $mm^2/s$ or less.

A thermal diffusivity $\alpha$ of the aluminum nitride phosphor ceramic can be measured at 25° C. according to the laser flash method using, for example, a sample measuring 10 mm (length)×10 mm (width)×2 mm (thickness) and a laser flash analyzer (for example, the LFA447, available from Netzsch GmbH). A specific heat capacity Cp utilized as the specific heat capacity of aluminum nitride (AlN) in this specification is 0.72 KJ/kg·K. Further, the apparent density of the aluminum nitride phosphor ceramic can be calculated by equation (1) below using the volume measured by the Archimedes method. In equation (1), the aluminum nitride phosphor ceramic is referred to as an AlN phosphor ceramic.

[Math. 1]

$$\text{Apparent density } \rho(kg/m^3) \text{ of AlN phosphor ceramic} = (\text{mass (kg) of AlN phosphor ceramic}) \div ((\text{volume of AlN phosphor ceramic(Archimedes method)}) \tag{1}$$

A thermal conductivity $\lambda$ of the aluminum nitride phosphor ceramic can be calculated by the product of the measured thermal diffusivity $\alpha$, the specific heat capacity Cp, and the density $\rho$ (apparent density), and specifically, the thermal conductivity $\lambda$ can be calculated by equation (2) below.

[Math. 2]

$$\text{Thermal conductivity}\Delta(W/m\cdot K) = (\text{thermal diffusivity}\alpha(m^2/s)) \times (\text{specific heat capacity Cp}(J/kg\cdot K)) \times (\text{apparent density}\rho(kg/m^3)) \tag{2}$$

The apparent density of the aluminum nitride phosphor ceramic is preferably 2.5 $g/cm^3$ (0.0025 kg/m 3) or greater. The apparent density of the aluminum nitride phosphor ceramic is more preferably 2.9 $g/cm^3$ or greater, even more preferably 3.0 $g/cm^3$ or greater, and particularly preferably 3.1 $g/cm^3$ or greater. Through this, the thermal conductivity can be improved. In addition, the apparent density of the aluminum nitride phosphor ceramic is equal to or less than the theoretical density and may be equal to or less than 3.5 $g/cm^3$.

The thermal conductivity of the aluminum nitride phosphor ceramic is, for example, in a range from 150 W/m·K to 250 W/m·K, preferably in a range from 150 W/m·K to 200 W/m·K, more preferably in a range from 210 W/m·K to 250 W/m·K, and particularly preferably in a range from 220 W/m·K to 250 W/m·K.

The excitation spectrum of the aluminum nitride phosphor ceramic preferably has an intensity in a range from 280 nm to 480 nm. In relation to the maximum intensity of the excitation spectrum, the excitation spectrum preferably has an intensity of 55% or greater in a range from 420 nm to 440 nm. In addition, the intensity is preferably 70% or more of the maximum intensity of the excitation spectrum in the range from 420 nm to 440 nm. Through such an intensity, the aluminum nitride phosphor ceramic can be efficiently excited in the range from 420 nm to 440 nm. For example, in the excitation spectrum of the aluminum nitride phosphor ceramic, the rate of change in the range from 305 nm to 325 nm is smaller than the rate of change in the range from 325 nm to 345 nm. When the aluminum nitride phosphor ceramic has an oxygen content of 1 mass % or less and a europium content of 1.1 mass % or less, and preferably, when the aluminum nitride phosphor ceramic has an oxygen content of 0.7 mass % or less and a europium content in a range from 0.08 mass % to 0.9 mass %, the excitation spectrum of the aluminum nitride phosphor ceramic has, for example, maximum and minimum values of intensity included in a range of ±5% or less in relation to an average value of intensity in a range from 370 nm to 385 nm. Furthermore, the excitation spectrum of the aluminum nitride phosphor ceramic can have a peak wavelength in a range from 385 nm to 410 nm.

The aluminum nitride phosphor ceramic is excited by an excitation light source and preferably emits green light having a light emission peak wavelength in a range from 500 nm to 550 nm. The light emission peak wavelength of light emitted when the aluminum nitride phosphor ceramic is excited by the excitation light source may be in a range from 510 nm to 540 nm. Note that in addition to green light, the aluminum nitride phosphor ceramic may also emit blue or red light by being doped with an element other than europium, the element thereof serving as the light emission center. A full width at half maximum (FWHM) of the light emission spectrum of the aluminum nitride phosphor ceramic is less than or equal to 100 nm, less than or equal to 90 nm, or less than or equal to 85 nm.

When the aluminum nitride phosphor ceramic has an oxygen content of 1 mass % or less and a europium content of 1.1 mass % or less, and preferably, when the aluminum nitride phosphor ceramic has an oxygen content of 0.7 mass % or less and a europium content in a range from 0.08 mass % to 0.9 mass %, the peak wavelength of the excitation light source can be set to a range from 340 nm to 440 nm. The peak wavelength of the excitation light source is preferably in a range from 360 nm to 430 nm, and is particularly preferably in a range from 385 nm to 410 nm. Since the aluminum nitride phosphor ceramic can be excited in a wavelength range in which the intensity of the excitation spectrum of the aluminum nitride phosphor ceramic is high, the aluminum nitride phosphor ceramic can be excited more efficiently.

Method for Manufacturing Light-Emitting Device

A method of manufacturing a light-emitting device includes: preparing a phosphor ceramic manufactured by the above-described manufacturing method; preparing an excitation light source; and disposing the phosphor ceramic at a position to be irradiated with light emitted by the excitation light source.

Light-Emitting Device

The light-emitting device includes a phosphor ceramic and an excitation light source. The light-emitting device emits, to the outside, at least light emitted from the phosphor ceramic excited by the excitation light source. The light-emitting device may emit a mixed color light including light from the excitation light source and light emitted from the phosphor ceramic excited by the excitation light source.

The excitation light source is, for example, a light-emitting element that emits light having a light emission peak wavelength in a range from 280 nm to 480 nm. The peak wavelength of the excitation light source is preferably in a range from 325 nm to 445 nm, more preferably in a range from 345 nm to 430 nm, and even more preferably in a range from 360 nm to 430 nm. Through this, the aluminum nitride phosphor ceramic can be excited at a wavelength at which the intensity of the excitation spectrum is high, and therefore the aluminum nitride phosphor ceramic can be efficiently excited.

Light-Emitting Device Using LED Element

Figure 4:
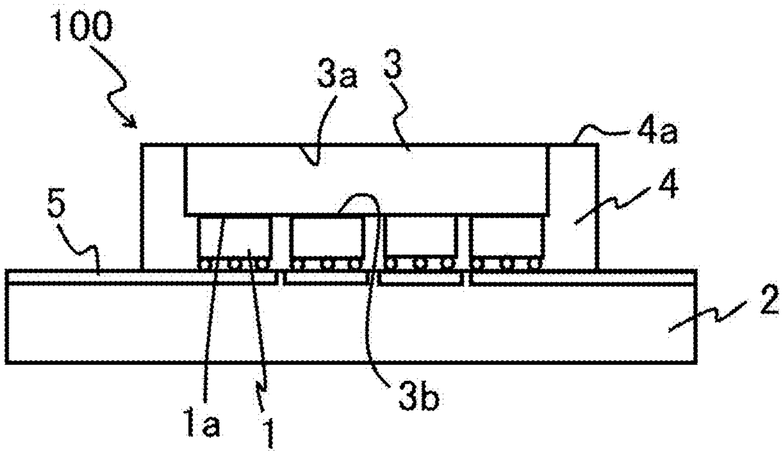
FIG. 4 is a schematic cross-sectional view illustrating an example of an embodiment of a light-emitting device in which an LED element is used.

FIG. 4 is a schematic cross-sectional view illustrating an example of an embodiment of a light-emitting device.

As the excitation light source, a light-emitting element having a light emission peak wavelength in a range from 280 nm to 480 nm can be used. The light-emitting element may be a semiconductor light-emitting element having a light emission peak wavelength in the range from 280 nm to 480 nm. The light-emitting element may be a light-emitting diode element (hereinafter, also referred to as an "LED element").

Light-Emitting Element

An LED element 1 is disposed on a wiring 5 provided on the substrate 2. Note that the wiring 5 may include an anode and a cathode. The LED element 1 can be selected in accordance with a light emission color, a wavelength, a size, a quantity, and a purpose. For example, a group III nitride semiconductor ($In_XAl_YGa_{1-X-Y}N$, $0 \le X$, $0 \le Y$, $X+Y \le 1$) can be used as the semiconductor light-emitting element having a light emission peak wavelength in the range from 280 nm to 480 nm. As the LED element 1, for example, an element that includes a positive and negative pair of electrodes on the same surface side can be used. The LED element 1 may be, for example, flip-chip mounted onto the wiring 5 by a bump. When the LED element 1 is flip-chip mounted onto the wiring 5, the surface facing the surface on which the pair of electrodes is formed is a light extraction surface. Note that there may be one LED element 1 per light-emitting device. With regard to the LED element 1, a light reflecting member 4 may be arranged, along with a phosphor ceramic 3, between a plurality of LED elements 1 whose periphery may be covered by the light reflecting member 4.

Phosphor Ceramic

The above-described aluminum nitride phosphor ceramic is used as the phosphor ceramic 3. The phosphor ceramic 3 can be arranged so as to cover one surface 1*a* that serves as a light extraction surface of the LED element 1. For example, one surface 3*b* of the phosphor ceramic 3 may cover the one surface 1*a* of the LED element 1. When the phosphor ceramic 3 covers the one surface 1*a* that serves as the light extraction surface of the LED element 1, the phosphor ceramic 3 is excited by light emitted from the LED element 1 and light is emitted from the phosphor ceramic 3. The phosphor ceramic emits, for example, green light. The one surface 3*a* of the phosphor ceramic 3 may be flush with one surface 4*a* of the light reflecting member 4, or may protrude from the light reflecting member 4*a*. In addition, the phosphor ceramic 3 having high thermal conductivity can dissipate heat to the outside of a light-emitting device

100. The phosphor ceramic 3 may be arranged in contact with the one surface 1*a* that serves as the light extraction surface of the LED element 1, and may be bonded by using an adhesive, a direct bonding method, or the like. When the LED element 1 and the phosphor ceramic 3 are to be directly bonded, the thickness of the phosphor ceramic 3 used in the light-emitting device 100 is, for example, in a range from 50 μm to 500 μm, may be in a range from 60 μm to 450 μm, and may be in a range from 70 μm to 400 μm.

Light-Emitting Device Using LD Element

Figure 5:
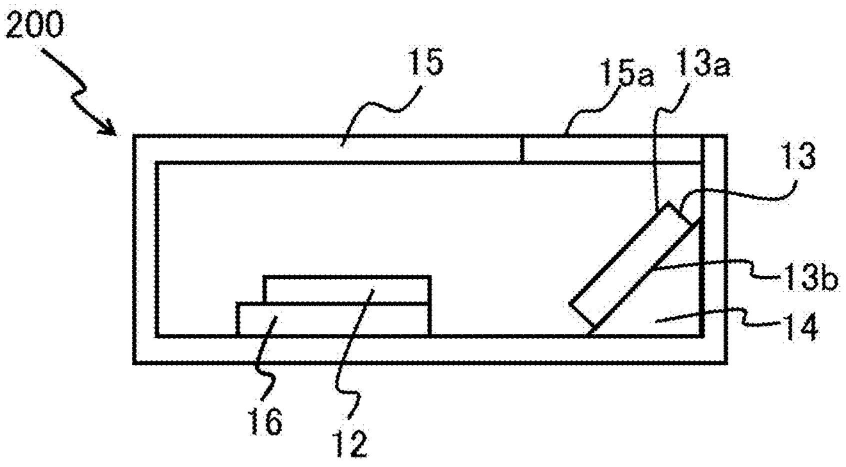
FIG. 5 is a schematic cross-sectional view illustrating an example of an embodiment of a light-emitting device in which an LD element is used.

FIG. 5 is a schematic cross-sectional view illustrating an example of an embodiment of a light-emitting device in which a laser diode element is used.

A light-emitting device 200 is provided with an LD element 12 and a phosphor ceramic 13 in a package member 15. The phosphor ceramic 13 is disposed at a position irradiated with laser light emitted from the LD element 12 directly or via an optical member or the like. The LD element 12 may be disposed on the package member 15 directly or with a submount 16 interposed therebetween. The phosphor ceramic 13 includes a first main surface 13*a* and a second main surface 13*b* located on a side opposite the first main surface 13*a*. The LD element 12 is disposed at the first main surface 13*a* side, and light emitted from the LD element 12 is directly irradiated onto the first main surface 13*a* of the phosphor ceramic 13. Further, the phosphor ceramic 13 may be provided with a light reflecting film and/or a light reflecting member 14 in contact or not in contact with a surface other than the light incident surface. For example, in a case in which light reflected by the phosphor ceramic 13 is emitted, the light reflecting film and/or the light reflecting member 14 can be disposed on a surface of the phosphor ceramic 13 on a side opposite the surface on which the excitation light is incident and from which light is extracted. The package member 15 may be constituted by a base and a light extraction window 15*a*, for example.

Laser Diode Element

An LD element can be used as the excitation light source. Examples of the LD element include an element having a layered structure of a semiconductor such as a group III nitride semiconductor ($In_XAl_YGa_{1-X-Y}N$, $0 \leq X$, $0 \leq Y$, $X+Y \leq 1$). For example, an LD element having an oscillation wavelength peak in a range from 280 nm to 480 nm may be used. In addition, an LD element having an oscillation wavelength peak preferably in a range from 325 nm to 445 nm, more preferably in a range from 340 nm to 430 nm, can be used. Particularly preferably, an LD element having an oscillation wavelength peak in a range from 360 nm to 430 nm is used. Through this, the aluminum nitride phosphor ceramic can be excited by light having a peak wavelength at which the intensity of the excitation spectrum is high, and therefore the aluminum nitride phosphor ceramic can be efficiently excited. The full width at half maximum of the light emission spectrum of the LD element is, for example, 5 nm or less, and preferably 3 nm or less.

The LD element and the phosphor ceramic are preferably arranged at positions separated from each other. This allows the heat dissipation path of the heat emitted from each member to be a separate path, and the heat to be efficiently emitted from each member.

Submount

Examples of the material of the submount include aluminum nitride, silicon carbide, a composite material of copper and diamond, and a composite material of aluminum and diamond. The composite material of copper and diamond and the composite material of aluminum and diamond contain diamond and thus have excellent heat dissipation.

Phosphor Ceramic

The phosphor ceramic emits light when excited by light emitted from the LD element. The above-described aluminum nitride phosphor ceramic is used as the phosphor ceramic. The thermal diffusivity and the thermal conductivity of the phosphor ceramic are both high, and therefore heat generated in the phosphor ceramic can be dissipated to reduce a decrease in light emission efficiency due to an increase in temperature.

Light Reflecting Film and/or Light Reflecting Member

The light reflecting film and/or the light reflecting member preferably has, relative to emitted laser light and/or light emitted from the phosphor ceramic, a reflectivity of 60% or greater, and may have a reflectivity of 90% or greater. An aluminum nitride phosphor ceramic having an oxygen content of 1 mass % or less and a europium content in a range from 0.08 mass % to 0.7 mass % is translucent, and therefore, by providing the light reflecting film and/or the light reflecting member, light that is transmitted and lost can be reflected, and light extraction efficiency can be improved.

The shape of the phosphor ceramic may be, for example, a plate shape. The plate-shaped member includes two flat surfaces parallel with and facing each other. In consideration of heat dissipation and handling characteristics, the thickness of the phosphor ceramic may be in a range from 50 μm to 1000 μm, may be in a range from 50 μm to 500 μm, or may be in a range from 80 μm to 350 μm. Further, the thickness of the phosphor ceramic may partially vary.

Package Member

The package member is preferably formed using a material having favorable heat dissipation, such as, for example, a metal including copper, a copper alloy, or an iron alloy, or a ceramic including aluminum nitride, aluminum oxide, or the like. The shape of the base and/or light extraction window that configure the package member may be a variety of shapes, such as a planar shape that is substantially circular, substantially elliptical, or substantially polygonal, for example. The light extraction window of the package member can be formed by, for example, glass or sapphire.

Note that the light-emitting device according to the present embodiment is not limited to the light-emitting device described above. For example, the light-emitting device may be a light-emitting device that implements wavelength conversion and has the phosphor ceramic provided outside a package including a light-emitting element, or may be a so-called CAN package type light-emitting device.

EXAMPLES

The present invention will be described in detail hereinafter using examples. However, the present invention is not limited to these examples.

Example 1

Step of Preparing Precursor

Powdered aluminum nitride (AlN) and powdered yttrium oxide ($Y_2O_3$) were dry mixed to produce a raw material mixture. In relation to a total amount of the raw material mixture, a content of aluminum nitride particles was 95 mass %, and a content of yttrium oxide particles was 5 mass %. A central particle size Da of the aluminum nitride particles was 1.1 μm, and a central particle size De of the yttrium oxide particles was 0.7 μm. Further, a particle size ratio De/Da of De to Da was 0.64. 15 parts by mass of paraffin wax were added as a binder per 100 parts by mass of the raw material mixture, and the mixture was kneaded using a kneader to produce a kneaded product. The kneaded product was fed into an injection molding machine and molded into a shape having a size of 13 mm (length)×13 mm (width)×3 mm (thickness). The molded kneaded product was heated and debinded in an atmosphere having a nitrogen stream (nitrogen gas 100 vol %) at a temperature of 500° C. under the barometric pressure (101.32 kPa) for 3 hours, and a molded body was produced. The carbon amount in the molded body was 500 ppm or less. The oxygen content in the sintered body measured by a later-described method was 2.2 mass %.

Step of Producing Aluminum Nitride Phosphor Ceramic

The resultant molded body (1.8 g) containing aluminum nitride and serving as a precursor was placed on a boron nitride setter placed in a crucible made of boron nitride, and 0.3 g of a powder of europium oxide ($Eu_2O_3$) (16.7 mass % of europium oxide relative to the mass of the precursor, the content of europium contained in the europium oxide per 1 g of aluminum nitride: 3.6 mg/cm$^3$) was introduced into the same crucible, which was then inserted into a carbon furnace and subjected to a second firing in a nitrogen-containing atmosphere (100 vol % of nitrogen gas) at a temperature of 1900° C. and a gauge pressure of 0.03 MPa for 2 hours, and an aluminum nitride phosphor ceramic of Example 1 in which the aluminum nitride crystal phase was doped with europium was produced.

Example 2

Step of Preparing Precursor

In the step of preparing a precursor, a molded body produced under the same conditions as Example 1 was placed on a boron nitride setter placed in a crucible made of boron nitride, inserted into a carbon furnace, and subjected to a first firing in a nitrogen-containing atmosphere (100 vol % of nitrogen gas) at a temperature of 1950° C. and a gauge pressure of 0.03 MPa for 35 hours, and a sintered body containing aluminum nitride was produced as a precursor. The oxygen content in the sintered body measured by the method described below was equal to or less than the detection limit.

Step of Producing Aluminum Nitride Phosphor Ceramic

The resultant sintered body (1.8 g) containing aluminum nitride and serving as a precursor was placed on a boron nitride setter placed in a crucible made of boron nitride, and 0.15 g of a powder of europium oxide ($Eu_2O_3$) (8.3 mass % of europium oxide relative to the mass of the precursor, the content of europium contained in the europium oxide per 1 g of aluminum nitride: 1.8 mg/cm$^3$) was introduced into the same crucible, which was then inserted into a carbon furnace and subjected to a second firing in a nitrogen-containing atmosphere (100 vol % of nitrogen gas) at a temperature of 1800° C. and a gauge pressure of 0.03 MPa for 2 hours, and an aluminum nitride phosphor ceramic of Example 2 in which the aluminum nitride crystal phase was doped with europium was produced.

Example 3

An aluminum nitride phosphor ceramic of Example 3 was produced in the same manner as in Example 2 with the exception that the temperature of the second firing was set to 1900° C. in the step of producing the aluminum nitride phosphor ceramic.

Example 4

An aluminum nitride phosphor ceramic of Example 4 was produced in the same manner as in Example 2 with the exception that in the step of producing the aluminum nitride phosphor ceramic, 0.3 g of a powder of europium oxide (16.7 mass % of europium oxide relative to the mass of the precursor, the content of europium contained in the europium oxide per 1 g of aluminum nitride: 3.6 mg/cm$^3$) was introduced relative to a sintered body (1.8 g) serving as a precursor and produced under the same conditions as Example 2.

Example 5

An aluminum nitride phosphor ceramic of Example 5 was produced in the same manner as in Example 4 with the exception that the temperature of the second firing was set to 1900° C. in the step of producing the aluminum nitride phosphor ceramic.

Example 6

An aluminum nitride phosphor ceramic of Example 6 was produced in the same manner as in Example 4 with the exception that the temperature of the second firing was set to 1950° C. in the step of producing the aluminum nitride phosphor ceramic.

Example 7

An aluminum nitride phosphor ceramic of Example 7 was produced in the same manner as in Example 2 with the exception that in the step of producing the aluminum nitride phosphor ceramic, 0.7 g of a powder of europium oxide (38.9 mass % of europium oxide relative to the mass of the precursor, the content of europium contained in the europium oxide per 1 g of aluminum nitride: 8.4 mg/cm$^3$) was introduced relative to a sintered body (1.8 g) serving as a precursor and produced under the same conditions as Example 2.

Example 8

An aluminum nitride phosphor ceramic of Example 8 was produced in the same manner as in Example 5 with the exception that the second firing was carried out in an Ar atmosphere in the step of producing the aluminum nitride phosphor ceramic.

Example 9

An aluminum nitride phosphor ceramic of Example 9 was produced in the same manner as in Example 2 with the exception that in the step of producing the aluminum nitride phosphor ceramic, the temperature of the second firing was set to 1950° C. and 0.7 g of a powder of europium oxide (38.9 mass % of europium oxide relative to the mass of the precursor, the content of europium contained in the europium oxide per 1 g of aluminum nitride: 8.4 mg/cm$^3$) was introduced relative to a sintered body (1.8 g) serving as a precursor and produced under the same conditions as Example 2.

Comparative Example 1

A molded body (1.8 g) produced under the same conditions as the precursor of Example 1 was placed on a boron nitride setter placed in a crucible made of boron nitride, inserted into a carbon furnace, and fired in a nitrogen-containing atmosphere (100 vol % of nitrogen gas) at a temperature of 1900° C. and a gauge pressure of 0.03 MPa for 2 hours without inserting a europium oxide powder, and the resultant product was used as an aluminum nitride-containing ceramic (hereinafter, also referred to as an "aluminum nitride ceramic") of Comparative Example 1. The aluminum nitride ceramic according to Comparative Example 1 did not emit light even when excited by light from the excitation light source.

Reference Example 1

An aluminum nitride ceramic of Reference Example 1 having a europium content of 0.03 mass % was produced in the same manner as in Example 2 with the exception that in the step of producing the aluminum nitride phosphor ceramic, the temperature of the second firing was set to 2000° C. and 0.3 g of a powder of europium oxide (16.7 mass % of europium oxide relative to the mass of the precursor, the content of europium contained in the europium oxide per 1 g of aluminum nitride: 3.6 mg/cm$^3$) was introduced relative to a sintered body (1.8 g) serving as a precursor and produced under the same conditions as Example 2.

Reference Example 2

A sintered body was produced as a precursor containing aluminum nitride under the same conditions as in Example 2. This sintered body was used as Reference Example 2. The oxygen content in the sintered body measured by the method described below was equal to or less than the detection limit.

Size of Aluminum Nitride Crystal Phase

The size of the aluminum nitride crystal phase was examined for a sample of the aluminum nitride phosphor ceramic of Example 5 and a sample of the aluminum nitride ceramic according to Comparative Example 1. The size of the aluminum nitride crystal phase was examined in an area measuring of 127 μm×88 μm of a cross-sectional SEM image observed at a magnification of 1000 times. A plurality of straight lines were drawn on the resultant image, and for each of the plurality of straight lines, the length from one grain boundary to another grain boundary of an aluminum nitride crystal phase overlapping the straight line was defined as the size of the aluminum nitride crystal phase, and the average value thereof was determined. The average size of the aluminum nitride crystal phase in the aluminum nitride phosphor ceramic of Example 5 was approximately 7.4 μm. The average size of the aluminum nitride crystal phase in the aluminum nitride ceramic of Comparative Example 1 was approximately 3.8 μm.

Apparent Density

Samples of each of the aluminum nitride phosphor ceramics of the Examples, a sample of the aluminum nitride ceramic of Comparative Example 1, and a sample of each aluminum nitride ceramic of the Reference Examples were prepared of a size of 10 mm (length)×10 mm (width)×2 mm (thickness), the volume and mass of each sample was measured, and the apparent density of each sample was calculated on the basis of equation (1) described above. The volume was measured by the Archimedes method. The results are shown in Table 1.

Thermal Diffusivity

Samples of each of the aluminum nitride phosphor ceramics of the Examples, a sample of the aluminum nitride ceramic of Comparative Example 1, and a sample of each aluminum nitride ceramic of the Reference Examples were prepared of a size of 10 mm (length)×10 mm (width)×2 mm (thickness), and the thermal diffusivity α of each sample was measured at 25° C. by a laser flash method using a laser flash analyzer (LFA447, available from Netzsch GmbH). The results are shown in Table 1.

Thermal Conductivity

For each sample of the aluminum nitride phosphor ceramics of the Examples, the aluminum nitride ceramic according to Comparative Example 1, and the aluminum nitride ceramics according to the Reference Examples, the thermal conductivity λ, was calculated on the basis of the measured apparent density, the thermal diffusivity α, and the specific heat capacity Cp of the aluminum nitride phosphor ceramic. The specific heat capacity Cp was calculated as 0.72 KJ/kg·K, which is the specific heat capacity of aluminum nitride. The results are shown in Table 1.

Contents of Europium (Eu) and Yttrium (Y)

The content of europium (Eu) or yttrium (Y) in the aluminum nitride phosphor ceramic of each of the Examples, in the aluminum nitride ceramic according to Comparative Example 1, and in the aluminum nitride ceramics of each of the Reference Examples was measured using an inductively coupled high-frequency plasma atomic emission spectrometry (ICP-AES) device after acid decomposition of the aluminum nitride phosphor ceramic or aluminum nitride ceramic. The results are shown in Table 1.

Content of Oxygen (O)

The amount of oxygen (O) in the aluminum nitride phosphor ceramics of each of the Examples, in the aluminum nitride ceramic according to Comparative Example 1, and in the aluminum nitride ceramics of each of the Reference Examples was measured using an oxygen/nitrogen analyzer. The results are shown in Table 1.

Light Emission Color and Light Emission Spectrum

Figure 6:
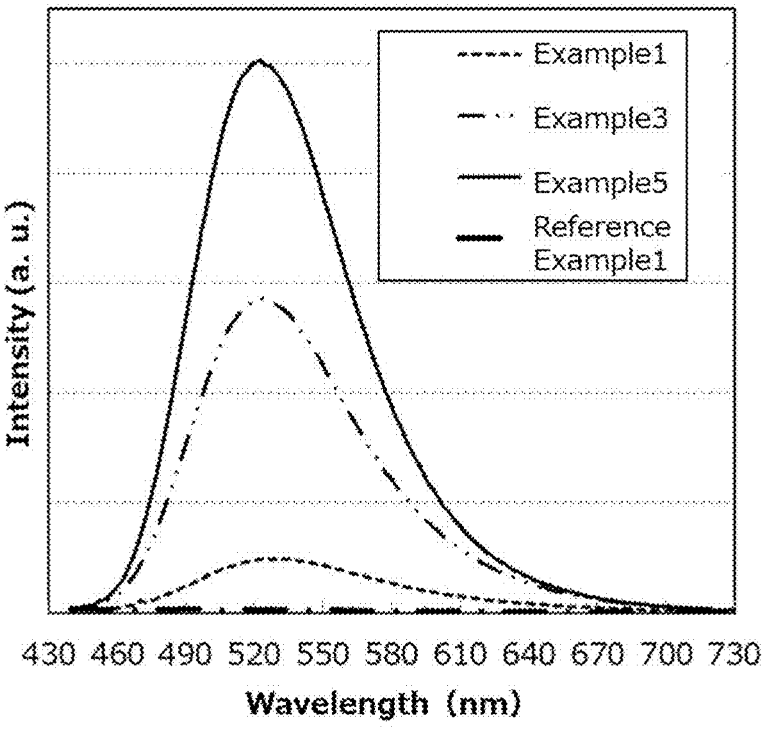
FIG. 6 is a diagram illustrating light emission spectra when phosphor ceramics according to Example 1, Example 3, and Example 5 and a ceramic sintered body according to Reference Example 1 were excited by a light source having a light emission peak wavelength of 365 nm.
Figure 7:
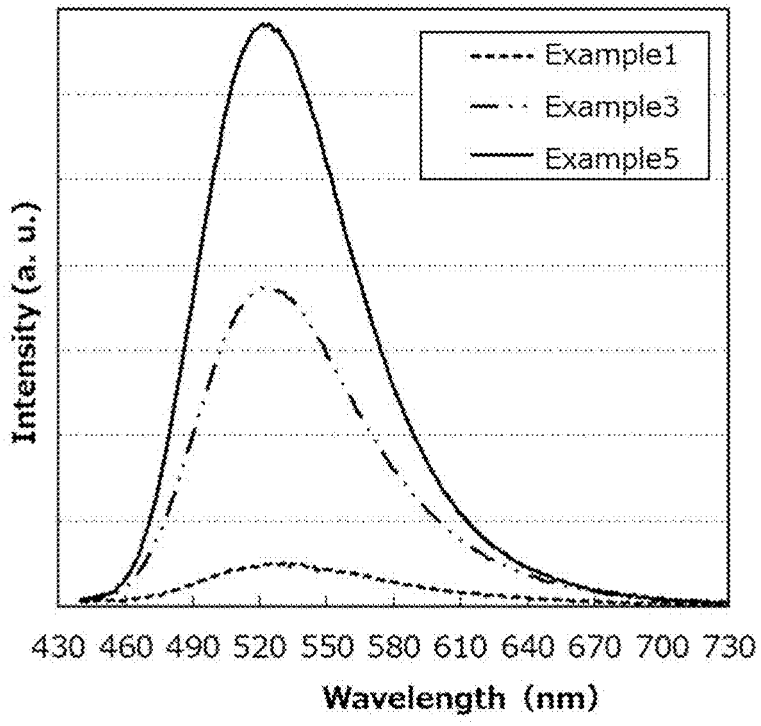
FIG. 7 is a diagram illustrating light emission spectra when aluminum nitride phosphor ceramics according to Example 1, Example 3, and Example 5 were excited by a light source having a light emission peak wavelength of 400 nm.

Samples of the aluminum nitride phosphor ceramics of Example 1, Example 3, and Example 5 and a sample of the aluminum nitride ceramic according to Reference Example 1 were each irradiated with, as an excitation light source, excitation light having a light emission peak wavelength of 365 nm or 400 nm, respectively, and the emission colors of the aluminum nitride phosphor ceramics were confirmed. Each sample was irradiated with the excitation light having a light emission peak wavelength of 365 nm or 400 nm, and the light emission spectra were measured at room temperature (25° C.±5° C.) using a quantum efficiency measurement apparatus (QE-2000, available from Otsuka Electronics Co., Ltd.). The light emission spectra of the aluminum nitride phosphor ceramics according to Example 1, Example 3, and Example 5 when irradiated with excitation light having a light emission peak wavelength of 365 nm are illustrated in FIG. 6 along with the light emission spectrum of the aluminum nitride ceramic according to Reference Example 1. The light emission spectra of the aluminum nitride phosphor ceramics according to Example 1, Example 3, and Example 5 when irradiated with excitation light having a light emission peak wavelength of 400 nm are illustrated in FIG. 7. The aluminum nitride phosphor ceramics were confirmed to have a light emission peak wavelength in a range from 500 nm to 550 nm both when irradiated with excitation light having a light emission peak wavelength of 365 nm and when irradiated with excitation light having a light emission peak wavelength of 400 nm, and the light emission color was confirmed to be green. In addition, the color tone of the light emission color of each aluminum nitride phosphor ceramic of the Examples when irradiated with excitation light having a light emission peak wavelength of 365 nm was visually confirmed. The color tone of light transmitted through each of the aluminum nitride phosphor ceramics of the Examples and emitted from the surface opposite the light incident surface when irradiated with excitation light having an emission peak wavelength of 380 nm was visually confirmed. The presence or absence of translucency of incident light was also visually confirmed using a 2 mm thick sample of each of the aluminum nitride phosphor ceramics of the Examples. The results are shown in Table 1.

Excitation Spectrum

Figure 8:
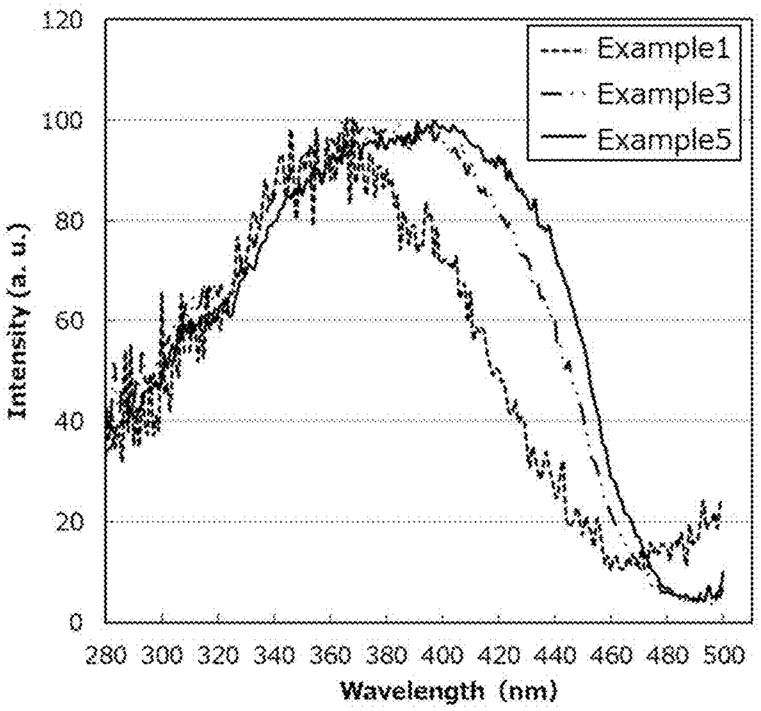
FIG. 8 is a diagram illustrating excitation spectra of the aluminum nitride phosphor ceramics according to Example 1, Example 3, and Example 5.

The excitation spectra of the aluminum nitride phosphor ceramics according to Example 1, Example 3, and Example 5 were measured using a spectrophotometer (F-4500, available from Hitachi High-Tech Science Corporation). The results are illustrated in FIG. 8.

As illustrated in FIGS. 6 and 7, it was confirmed that both when the peak wavelength of the excitation light was 365 nm and when the peak wavelength of the excitation light was 400 nm, the aluminum nitride phosphor ceramics according to Example 1, Example 3, and Example 5 emitted green light with the light emission peak wavelength being in the wavelength range of green light from 500 nm to 550 nm. The aluminum nitride phosphor ceramic of Example 5 had a luminous intensity about 10 times higher than that of the aluminum nitride phosphor ceramic of Example 1 in response to the excitation light having a light emission peak wavelength at 365 nm, and had a luminous intensity about 13.6 times higher than that of the aluminum nitride phosphor ceramic of Example 1 in response to the excitation light having a light emission peak wavelength at 400 nm. It is conceivable that this is because, for example, the aluminum nitride phosphor ceramic according to Example 5 had a lower oxygen content and less absorption by the grain boundary phase than the aluminum nitride phosphor ceramic according to Example 1. The aluminum nitride ceramic according to Reference Example 1 had a europium content of 0.03 mass %, but did not emit light in response to excitation light.

TABLE 1

| | Second Firing Condition | | | | Aluminum nitride phosphor ceramics | | | | | | | | | |
|---|---|---|---|---|---|---|---|---|---|---|---|---|---|---|
| | Precursor | $Eu_2O_3$ (mass %) | Eu (mg/cm$^3$) | Firing Temperature (° C.) | O (mass %) | Eu (mass %) | Y (mass %) | Emission color (Excitation wave length 365 nm) | Emission color (Excitation wave length 380 nm) | Translucency at Thicness of 2 mm | Apparent Density (g/cm$^3$) | Thermal Diffusivity (mm$^2$/s) | Thermal Conductivity (W/m · K) |
| Example 1 | molded body | 16.7 | 3.6 | 1900 | 2.2 | 0.87 | 3.90 | green | none | none | 3.33 | 69 | 166 |
| Example 2 | sintered body | 8.3 | 1.8 | 1800 | 0.1 | 0.10 | 0.19 | green | green | present | 3.27 | 99 | 232 |
| Example 3 | | 8.3 | 1.8 | 1900 | 0.3 | 0.45 | 0.15 | green | green | present | 3.27 | 95 | 224 |
| Example 4 | | 16.7 | 3.6 | 1800 | 0.1 | 0.06 | 0.20 | green | green | present | 3.27 | 98 | 231 |
| Example 5 | | 16.7 | 3.6 | 1900 | 0.2 | 0.28 | 0.07 | green | green | present | 3.27 | 95 | 223 |
| Example 6 | | 16.7 | 3.6 | 1950 | 0.2 | 0.20 | 0.10 | green | green | present | 3.27 | 99 | 233 |
| Example 7 | | 38.9 | 8.4 | 1900 | 0.3 | 0.62 | 0.14 | green | yellow | present | 3.27 | 92 | 217 |
| Example 8 | | 16.7 | 3.6 | 1900 | 0.2 | 0.14 | 0.16 | green | yellowish-green | present | 3.27 | 85 | 200 |
| Example 9 | | 38.9 | 8.4 | 1950 | 0.6 | 1.10 | 0.23 | green | yellow | present | 3.29 | 86 | 203 |
| Conparative Example 1 | sintered body | — | — | — | 1.7 | — | 3.90 | none | none | none | 3.32 | 76 | 181 |
| Reference Example 1 | sintered body | 16.7 | 3.6 | 2000 | 0.1 | 0.03 | 0.06 | none | none | present | 3.27 | 99 | 234 |
| Reference Example 2 | — | — | — | — | — | — | 0.19 | none | none | present | 3.27 | 107 | 251 |

The aluminum nitride phosphor ceramics according to Examples 1 to 9 had a europium (Eu) content in a range from greater than 0.03 mass % to 1.5 mass %, and emitted light upon reception of light emitted from the excitation light source. In addition, the aluminum nitride phosphor ceramics according to Examples 2 to 8 were confirmed to have an oxygen content of 0.5 mass % or less and a high thermal conductivity of 200 (W/m·K) or greater and to exhibit translucency. In the aluminum nitride phosphor ceramic according to Example 1, the oxygen content was high at 2.2 mass %, and when the aluminum nitride phosphor ceramic was irradiated with an excitation light source having a light emission peak wavelength of 380 nm, light emission could not be visually confirmed at the surface opposite the incident surface of the excitation light source. It is presumed that this is due to containing a large amount of grain boundary phases containing an oxide.

The aluminum nitride ceramic according to Comparative Example 1, which was not subjected to a second firing in contact with a gas containing europium, and the aluminum nitride ceramic according to Reference Example 1 in which the amount of europium in the ceramic was 0.03 mass % did not emit light in response to light from the excitation light source.

As illustrated in FIG. 8, the aluminum nitride phosphor ceramics according to Example 3 and Example 5 each had a portion where the intensity was higher than the excitation spectrum of the aluminum nitride phosphor ceramic according to Example 1 in a range of the 380 nm or higher. The excitation spectrum of the aluminum nitride phosphor ceramic according to Example 5 had a peak wavelength in a range from 385 nm to 410 nm.

X-Ray Diffraction Pattern

Figure 9:
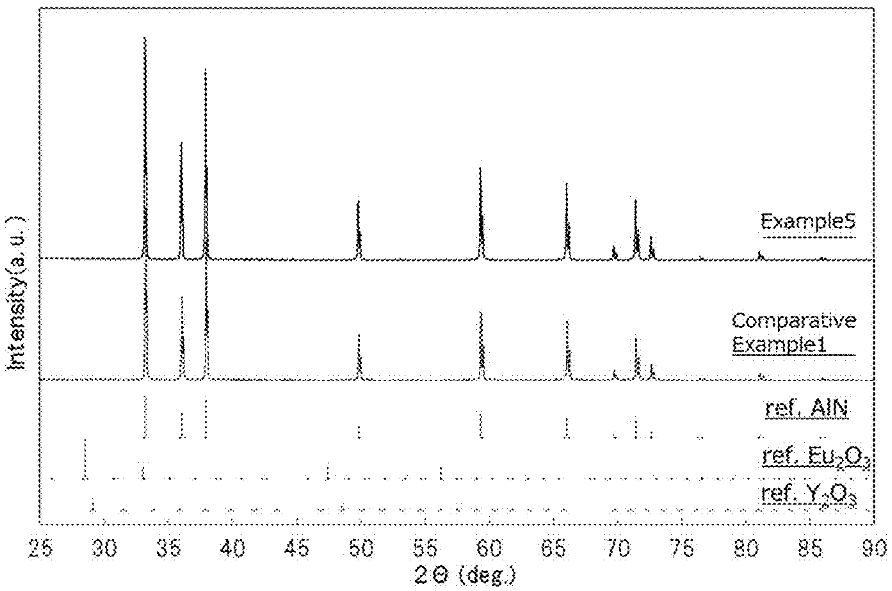
FIG. 9 is a diagram illustrating each XRD spectrum of the aluminum nitride phosphor ceramic according to Example 5, the aluminum nitride ceramic according to Comparative Example 1, and AlN, $Eu_2O_3$, and $Y_2O_3$ registered in a datasheet.

The X-ray diffraction patterns of the aluminum nitride phosphor ceramic according to Example 5 and the aluminum nitride ceramic according to Comparative Example 1 were measured using an X-ray diffractometer (SmartLab, available from Rigaku Corporation) and CuKα radiation ($\lambda$=0.15418 nm, tube voltage 45 kV, tube current 40 mA) as the X-ray source. The resultant X-ray diffraction (XRD) patterns indicating diffraction intensity with respect to the diffraction angle (2θ) are illustrated in FIG. 9. FIG. 9 illustrates the X-ray diffraction pattern of the aluminum nitride phosphor ceramic according to Example 5 and the X-ray diffraction pattern of the aluminum nitride ceramic according to Comparative Example 1 in this order from the top, and illustrates, as reference examples in the following order from the top, the X-ray diffraction (XRD) patterns of AlN, $Eu_2O_3$, and $Y_2O_3$ registered in the Inorganic Crystal Structure Database (ICSD).

As illustrated in FIG. 9, the XRD patterns of the aluminum nitride phosphor ceramic according to Example 5 and the aluminum nitride ceramic according to Comparative Example 1 have peaks at substantially the same positions as those of the diffraction angles 2θ of the XRD pattern of AlN, and thus it was confirmed that the aluminum nitride phosphor ceramic according to Example 5 and the aluminum nitride ceramic according to Comparative Example 1 have substantially the same structure as that of AlN.

Elemental Analysis of Aluminum Nitride Phosphor Ceramic: SEM-EDX Analysis

Figure 10:
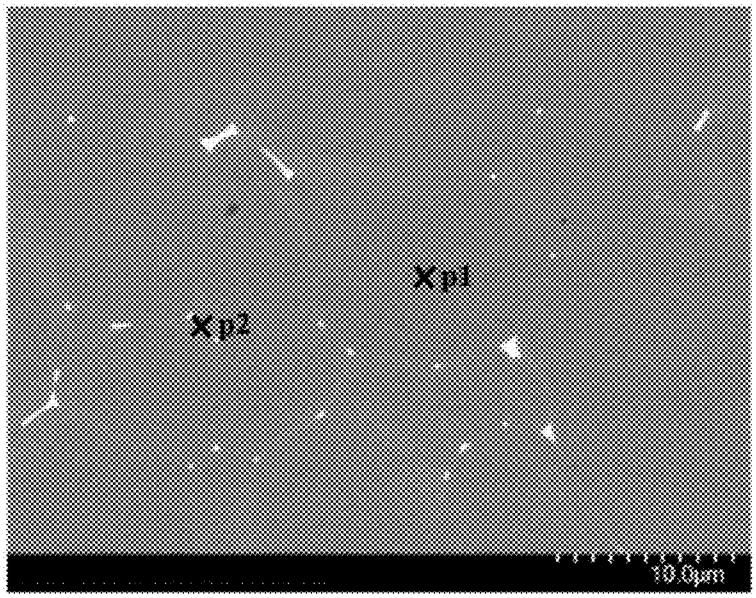
FIG. 10 is an SEM photograph of a backscattered electron image of a partial cross section of the phosphor ceramic according to Example 5, and shows locations of analysis using SEM-EDX.
Figure 11:
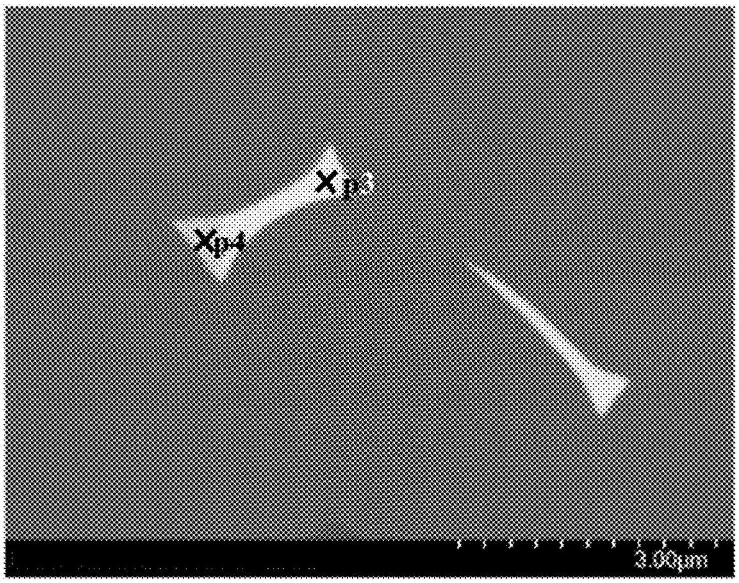
FIG. 11 is an SEM photograph of a backscattered electron image of a partial cross section of the phosphor ceramic according to Example 5, and shows locations of analysis using SEM-EDX.
Figure 12:
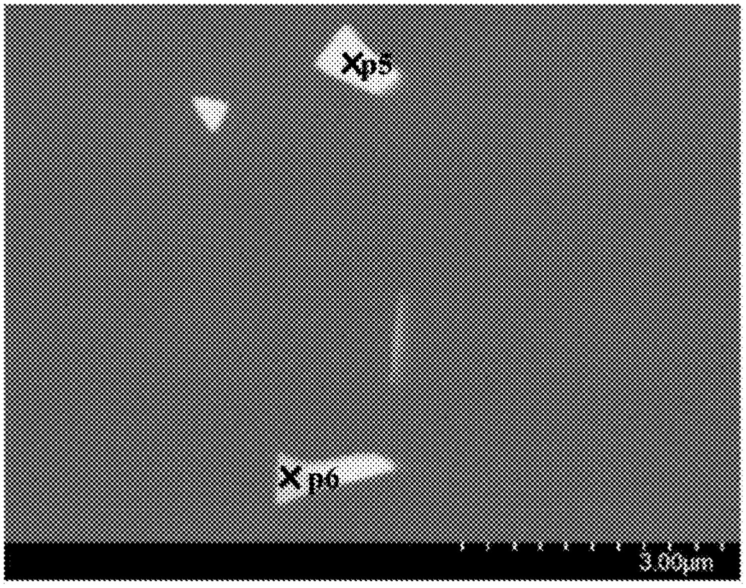
FIG. 12 is an SEM photograph of a backscattered electron image of a partial cross section of the phosphor ceramic according to Example 5, and shows locations of analysis using SEM-EDX.

The surface of the aluminum nitride phosphor ceramic according to Example 5 was finished with a cross-section polisher (CP), and the aluminum nitride phosphor ceramic was then coated with carbon. Subsequently, a backscattered electron image of a cross section of the aluminum nitride phosphor ceramic was observed and quantitatively analyzed. In the quantitative analysis, a backscattered electron image of a cross section of the aluminum nitride phosphor ceramic according to Example 5 was observed and subjected to quantitative analysis using an SEM-EDX device (SU8230, available from Hitachi, Ltd., SDD detector). The elements of N, O, Al, Y, and Eu of the aluminum nitride phosphor ceramic were each semi-quantitatively analyzed. The content (mass %) of each element was calculated using 100 mass % as the total of the analytical values of N, O, Al, Y, and Eu in the aluminum nitride phosphor ceramic at each measurement point. Results rounded to the nearest tenth are presented in Table 2. Note that the total amount of N, O, Al, Y, and Eu in the aluminum nitride phosphor ceramic may not equal 100 mass % as a result of the rounding. In FIGS. 10 to 15, locations marked by x indicate approximate analysis locations. In FIG. 10, p1 indicates the analysis position in the aluminum nitride crystal phase. p2 indicates an analysis position where the aluminum nitride crystal phase and the grain boundary phase cannot be clearly distinguished. In FIGS. 11, p3 and p4 indicate analysis positions of different sites in one grain boundary phase. In FIGS. 12, p5 and p6 indicate analysis positions in respectively different grain boundary phases.

TABLE 2

| Measurement Position (SEM-EDX) | | Element N | O | Al | Y | Eu |
|---|---|---|---|---|---|---|
| p1 | A N crystal phase | 34.0 | 1.5 | 64.6 | — | — |
| p2 | A N crystal phase or grain boundary phase | 33.6 | 1.7 | 64.6 | — | — |
| p3 | grain boundary phase | — | 15.0 | 13.0 | — | 72.0 |
| p4 | grain boundary phase | — | 21.9 | 9.7 | 62.0 | 6.5 |
| p5 | grain boundary phase | — | 15.5 | 13.6 | — | 71.0 |
| p6 | grain boundary phase | — | 22.1 | 9.6 | 62.0 | 5.9 |

At two positions (p1 and p2) in the backscattered electron image illustrated in FIG. 10 with regard to a cross section of the aluminum nitride phosphor ceramic according to Example 5, the ratio of nitrogen and aluminum was substantially equivalent to the ratio of aluminum nitride, and thus it was confirmed that an aluminum nitride crystal phase was formed. The aluminum nitride phosphor ceramic according to Example 5 was excited by light from the excitation light source and emitted light, and therefore Eu serving as a light emission center was contained. However, the amount of Eu contained in the aluminum nitride crystal phase was equal to or less than the detection limit value of SEM-EDX. At four positions (p3, p4, p5 and p6) of the grain boundary phases in the backscattered electron images of the cross section of the aluminum nitride phosphor ceramic according to Example 5 and illustrated in FIGS. 11 and 12, a portion with a large amount of Eu and a portion with a large amount of Y were present, the positions p3 and p5, which were bright even in the grain boundary phase, contained a large amount of Eu, and the positions p4 and p6, which were dark even in the grain boundary phase, contained a large amount of Y. In FIGS. 11 and 12, it is presumed that grain boundary phases composed of oxides containing a large amount of Eu were formed at the positions p3 and p5 in the grain boundary phase. In FIGS. 11 and 12, it is also presumed that grain boundary phases composed of oxides containing a large amount of Y were formed at the positions p4 and p6 in the grain boundary phase.

Elemental Analysis of Aluminum Nitride Phosphor Ceramic: EPMA Analysis

Figure 13:
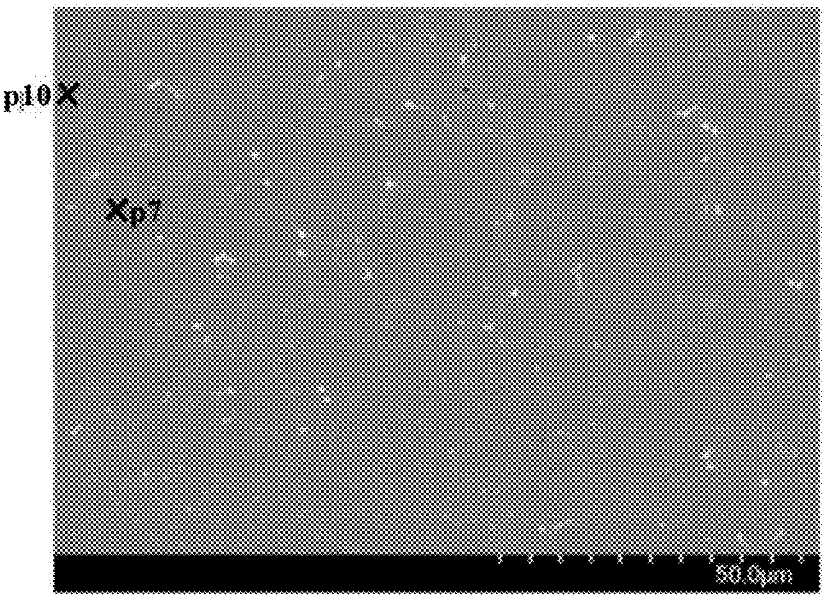
FIG. 13 is an SEM photograph of a backscattered electron image of a partial cross section of the phosphor ceramic according to Example 5, and shows locations of analysis using EPMA.
Figure 14:
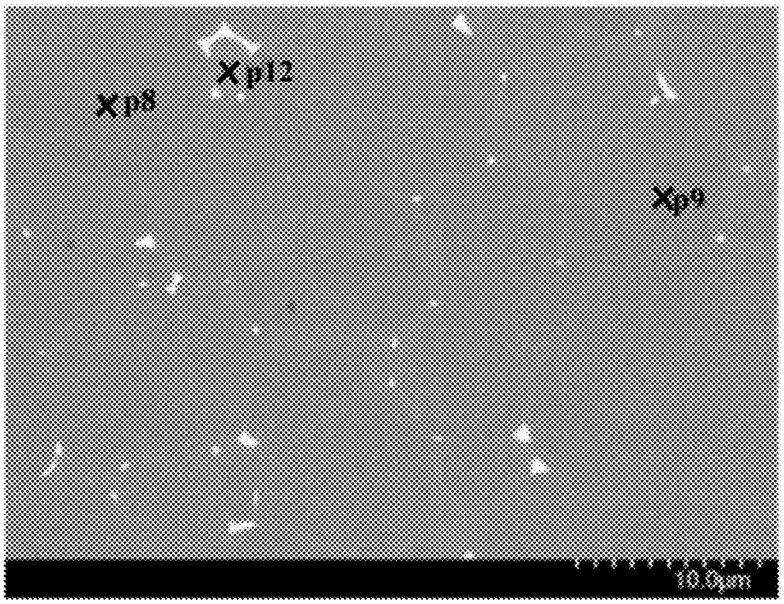
FIG. 14 is an SEM photograph of a backscattered electron image of a partial cross section of the phosphor ceramic according to Example 5, and shows locations of analysis using EPMA.
Figure 15:
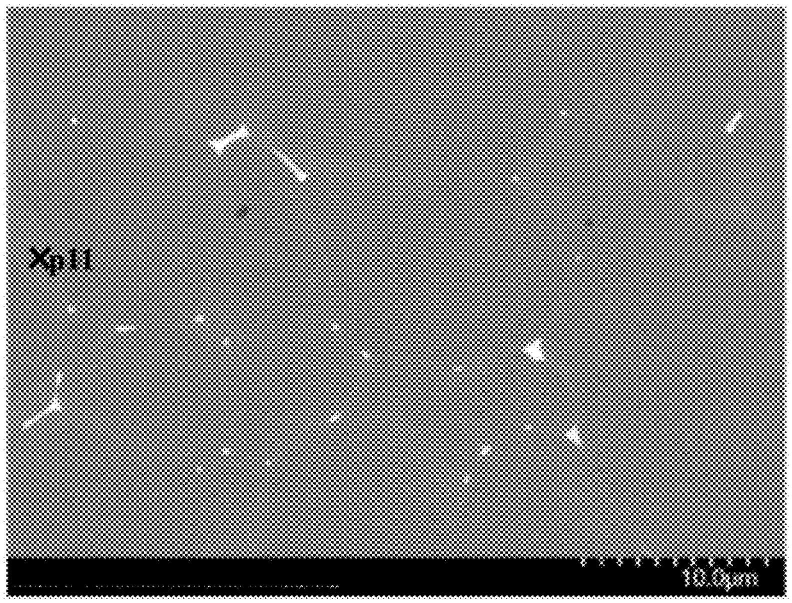
FIG. 15 is an SEM photograph of a backscattered electron image of a partial cross section of the phosphor ceramic according to Example 5, and shows locations of analysis using EPMA.

The surface of the aluminum nitride phosphor ceramic according to Example 5 was finished with a cross-section polisher (CP), and the aluminum nitride phosphor ceramic was then coated with carbon. Subsequently, a backscattered electron image of a cross section of the aluminum nitride phosphor ceramic was observed and quantitatively analyzed. Each element of nitrogen (N), oxygen (O), aluminum (Al), yttrium (Y), and europium (Eu) at each measurement position of the aluminum nitride crystal phase in the cross section of the aluminum nitride phosphor ceramic was subjected to quantitative analysis using an EPMA device (JXA-8500F, available from JEOL Ltd.). The content (mass %) of each element was calculated using 100 mass % as the total of the analytical values of N, O, Al, Y, and Eu at each measurement position. Results rounded to the nearest hundredth are shown in Table 2. FIGS. 13 to 15 are SEM photographs of backscattered electron images of a cross section of the aluminum nitride phosphor ceramic according to Example 5. In FIG. 13, p7 indicates an analysis position in the aluminum nitride crystal phase, and p10 indicates the analysis position in the grain boundary phase. In FIGS. 14, p8 and p9 indicate analysis positions in the aluminum nitride crystal phase, and p12 indicates an analysis position where the aluminum nitride crystal phase or the grain boundary phase cannot be distinguished. In FIG. 15, p11 indicates an analysis position in the grain boundary phase.

TABLE 3

| Measurement position (EPMA) | | Element N | O | Al | Y | Eu |
|---|---|---|---|---|---|---|
| p7 | A N crystal phase | 29.30 | 0.78 | 69.92 | — | — |
| p8 | A N crystal phase | 29.53 | 0.76 | 69.71 | — | — |
| p9 | A N crystal phase | 29.69 | 0.75 | 69.56 | — | — |
| p10 | grain boundary phase | 30.23 | 0.65 | 67.61 | — | 1.51 |
| p11 | grain boundary phase | 28.54 | 0.94 | 70.52 | — | — |
| p12 | A N crystal phase or grain boundary phase | 28.58 | 1.56 | 69.67 | — | 0.19 |

At three positions (p7, p8, and p9) of the aluminum nitride crystal phases illustrated in FIGS. 13 and 14, the amount of Eu was equal to or less than the detection limit value (0.01 mass %). The aluminum nitride phosphor ceramic according to Example 5 was excited by light from the excitation light source and emitted light, and therefore Eu serving as a light emission center was contained. However, the amount of Eu contained in the aluminum nitride crystal phase was equal to or less than the detection limit value of EPMA. In addition, a grain boundary phase in which Eu was detected and a grain boundary phase in which Eu was not detected were present at two positions (p10 and p11) of the grain boundary phases illustrated in FIGS. 13 and 15. It is presumed that a grain boundary phase composed of an oxide such as Al—O—N—Eu was formed in the grain boundary phase at the position where Eu was detected. At two positions (p10 and p11) of the grain boundary phase in the backscattered electron images of the cross section of the aluminum nitride phosphor ceramic according to Example 5 illustrated in FIGS. 13 and 15, Y was not measured and the amount of Y was equal to or less than the detection limit value (0.01 mass %). It was confirmed that Eu was detected at the measurement position p12 in the backscattered electron image of the cross section of the aluminum nitride phosphor ceramic according to Example 5 illustrated in FIG. 14.

INDUSTRIAL APPLICABILITY

The aluminum nitride phosphor ceramic according to the present embodiment can be used in a semiconductor package. Further, the aluminum nitride phosphor ceramic can be combined with a light-emitting element such as an LED or an LD serving as an excitation light source and used as a wavelength conversion member for a backlight of a liquid crystal display device or for an illumination device for use in a vehicle. Further, the aluminum nitride phosphor ceramic can also be used as a detector for ultraviolet light.

REFERENCE SIGNS LIST

1 LED element
2 Substrate
3, 13: Aluminum nitride phosphor ceramic
4, 14: Light reflecting member
5: Wiring
12: LD element
15: Package member
16: Submount
100, 200: Light-emitting device

The invention claimed is:

1. A method for manufacturing a phosphor ceramic, the method comprising:

preparing a precursor that is either a molded body containing aluminum nitride or a sintered body containing aluminum nitride; and producing an aluminum nitride phosphor ceramic having a content of europium in a range from greater than 0.03 mass % to 1.5 mass % by bringing the precursor into contact with a gas containing europium.

2. The method for manufacturing a phosphor ceramic according to claim 1, wherein, in the producing of the aluminum nitride phosphor ceramic, the precursor is fired in an atmosphere containing europium at a temperature in a range from a boiling point of metallic europium to less than 2000° C.

3. The method for manufacturing a phosphor ceramic according to claim 2, wherein, in the producing of the aluminum nitride phosphor ceramic, the precursor and a compound containing europium, the compound containing europium being disposed so as not to be in direct contact with the precursor, are fired at a temperature in a range from the boiling point of the metallic europium to less than 2000° C.

4. The method for manufacturing a phosphor ceramic according to claim 1, wherein a charging amount of the europium per 1 g of the aluminum nitride of the precursor is in a range from 1.2 $mg/cm^3$ to 12 $mg/cm^3$.

5. The method for manufacturing a phosphor ceramic according to claim 1, wherein the precursor is a sintered body containing the aluminum nitride.

6. The method for manufacturing a phosphor ceramic according to claim 2, wherein the precursor is a sintered body containing the aluminum nitride.

7. The method for manufacturing a phosphor ceramic according to claim 5, wherein the sintered body containing aluminum nitride comprises oxygen, and a content of the oxygen is 0.3 mass % or less.

8. The method for manufacturing a phosphor ceramic according to claim 6, wherein the sintered body containing aluminum nitride comprises oxygen, and a content of the oxygen is 0.3 mass % or less.

9. The method for manufacturing a phosphor ceramic according to claim 1, wherein the gas containing europium is produced by reducing europium oxide.

10. The method for manufacturing a phosphor ceramic according to claim 8, wherein the gas containing europium is produced by reducing europium oxide.

11. The method for manufacturing a phosphor ceramic according to claim 1, wherein the precursor is the sintered body containing aluminum nitride, and wherein the sintered body containing aluminum nitride is produced by firing aluminum nitride particles and a sintering aid containing a rare earth element other than europium.

12. The method for manufacturing a phosphor ceramic according to claim 1, wherein the molded body is produced by molding a raw material mixture or kneaded product by injection molding method.

13. A method for manufacturing a light-emitting device, the method comprising:

preparing a phosphor ceramic manufactured by the manufacturing method according to claim 1;

preparing an excitation light source; and disposing the phosphor ceramic at a position to be irradiated with light emitted by the excitation light source.

* * * * *